United States Patent Office 2,778,833
Patented Jan. 22, 1957

2,778,833

4-AMINO-10-HYDROXY-1,7-PHENANTHROLINES

Alexander R. Surrey, Albany, N. Y., assignor to Sterling Drug Inc., New York, N. Y., a corporation of Delaware No Drawing. Application October 21, 1954, Serial No. 463,809

40 Claims. (Cl. 260—286)

This invention relates to 4-substituted-amino-10-hydroxy-1,7-phenanthrolines, to their acid addition salts and quaternary ammonium salts, and to the preparation of these compounds, and to the intermediate 4-chloro-10-hydroxy-1,7-phenanthroline.

My compounds in their free base from have the general formula

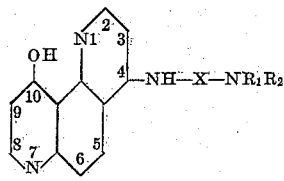

where X is a member of the group consisting of an alkylene radical having two to eight carbon atoms and having its two free valence bonds on different carbon atoms, a 2-hydroxy-1,3-propylene radical, and an oxaalkylene radical having four to eight carbon atoms and having its oxygen atom at least one carbon atom removed from each terminal carbon atom bearing a free valence bond, and $NR_1R_2$ is a member of the group consisting of di-(lower alkyl)amino, N-(lower alkyl)-N-(lower beta - hydroxyalkyl)amino, N - (lower alkyl) - N - benzylamino, N - (lower alkyl) - N - (lower alkylated - benzyl)amino, N - (lower alkyl) - N - (lower alkoxylated- benzyl)amino, N - (lower alkyl) - N - (halogenated - benzyl)amino, 1 - piperidyl, (lower alkylated) - 1-piperidyl, 1-pyrrolidyl, (lower alkylated)-1-pyrrolidyl and 4-morpholinyl. Pharmacological evaluation of these compounds of my invention has shown them to possess anticholinesterase activity. Also, these compounds can be used to prepare salts hereinafter described.

In the above general formula the lower alkylene radical designated as X has two to eight carbon atoms including such examples as

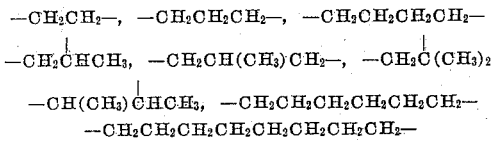

and the like. X, when designated as an oxa-alkylene radical having four to eight carbon atoms and having its oxygen atom at least one carbon atom removed from the terminal carbon atom bearing a free valence bond, includes such examples as —CH₂CH₂OCH₂CH₂—

—CH₂CH₂CH₂OCH₂CH₂—

—CH₂CH₂CH₂CH₂OCH₂CH₂—

—CH₂CH₂OCH₂CH₂CH₂CH₂CH₂CH₂—

—CH₂CH(CH₃)OCH₂CH₂—

—CH₂CH₂CH₂CH₂OCH₂CH₂CH₂CH₂— and the like. The tertiary-amino radical, shown above as $NR_1R_2$, comprehends dialkylamino radicals where $R_1$ and $R_2$ are lower alkyl groups alike or different and each alkyl group has from one to six carbon atoms, such dialkylamino radicals including dimethylamino, diethylamino, ethylmethylamino, diisopropylamino, ethyl-n-propylamino, di-n-butylamino, di-n-hexylamino, and the like. In addition, the tertiary-amino radical designated as $NR_1R_2$ encompasses N-(lower alkyl)-N-(lower beta-hydroxyalkyl)amino radicals such as N-ethyl-N-(2-hydroxyethyl)amino, N-methyl-N-(2-hydroxypropyl)amino, N-(n-propyl)-N-(2-hydroxybutyl)amino, N - (n-hexyl)-N-(2-hydroxyethyl)amino, and the like; N-(lower alkyl)-N-benzylamino radicals such as N-methyl-N-benzylamino, N-ethyl-N-benzylamino, N-isobutyl-N-benzylamino, N-(n-hexyl)-N-benzylamino, and the like; N-(lower alkyl)-N-(lower alkylated-benzyl)amino radicals such as N-methyl-N-(4-n-butylbenzyl)amino, N-ethyl-N-(2,4-dimethylbenzyl)amino, N - (n - butyl)-N-(3-ethylbenzyl)amino, N - (n-hexyl)-N-(3,4,5-trimethylbenzyl)amino, and the like, the lower alkyl substituents of the benzene ring of the benzyl radical each having from one to six carbon atoms as illustrated; N-(lower alkyl)-N-(lower alkoxylated-benzyl)amino radicals such as N-methyl-N-(4-n-butoxybenzyl)amino, N-ethyl-N-(2,4 - dimethoxybenzyl)amino, N - isopropyl - N - (2,4,6 - trimethoxybenzyl)amino, N - (n - hexyl) - N - (3,4 - diethoxybenzyl)amino, N - ethyl - N -(4 - n - hexoxybenzyl)amino, and the like, the lower alkoxyl substituents of the benzene ring of the benzyl radical each having from one to six carbon atoms as illustrated; and N - (lower alkyl) - N - (halogenated-benzyl)amino radicals such as N - methyl - N - (2 - chlorobenzyl)amino, N - ethyl - N - (2,4 - dibromobenzyl)amino, N - isopropyl - N - (3 - iodobenzyl)amino, N - (n - hexyl) - N - (3,4 - dichlorobenzyl)amino, N - ethyl - N - (2,4,6 - trichlorobenzyl)amino, N-ethyl-N-(4-fluorobenzyl)amino, and the like. Further, the tertiary-amino radical designated as $NR_1R_2$ encompasses saturated N-heteromonocyclic radicals having five to six ring atoms, illustrated by examples such as 1-piperidyl; (lower alkylated)-1-piperidyl such as 2-methyl-1-piperidyl, 3-ethyl-1-piperidyl, 4 - methyl - 1 - piperidyl, 2,6 - dimethyl - 1 - piperidyl; 1 - pyrrolidyl; (lower alkylated) - 1 - pyrrolidyl such as 2 - methyl - 1 - pyrrolidyl, 3 - ethyl - 1 - pyrrolidyl, 2,5 - dimethyl - 1 - pyrrolidyl; 4 - morpholinyl; and the like.

My invention comprehends not only the above-described 4 - substituted - amino - 10 - hydroxy - 1,7 - phenanthrolines in their free base form, but also their acid addition salts and quaternary ammonium salts. My basic phenanthrolines have four nitrogen atoms, any one of which may enter into salt formation to give a monoacid addition or quarternary ammonium salt, and where more than one of the nitrogen atoms is caused to enter into such salt formation, there may be obtained di-, tri-, and tetra-acid addition, quaternary ammonium or mixed acid addition-quaternary ammonium salts, and the invention thus broadly encompasses all of these salts. The four nitrogen atoms vary in degree of basicity and it has been observed that the mono- and di-salts are the forms more readily isolated, and thus are the preferred embodiments, e. g., monohydrochloride, dihydrochloride, 2-chlorobenzochloride; dimethiodide, benzochloride-monohydrochloride, etc.

Quaternary ammonium salts of my invention have the formula

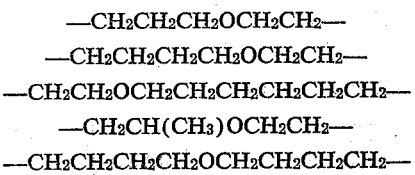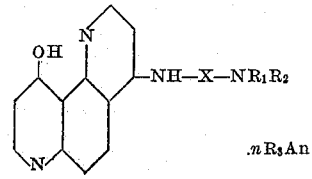

where X and NR₁R₂ have the meanings given above, n is an integer from 1 to 4, R₃ is a lower alkyl radical or a benzyl radical (as defined below) and An is a non-toxic anion. Preferred embodiments of my quaternary ammonium salts are those where n is 1 to 2. Pharmacological evaluation of my salts has shown them to possess curarimimetic and anticholinesterase activity.

In the above formula, R₃ when lower alkyl has preferably from one to six carbon atoms inclusive and comprehends radicals such as methyl, ethyl, n-propyl, isopropyl, n-butyl, isobutyl, 2-butyl, n-amyl, isoamyl, n-hexyl, and the like; R₃ when a benzyl radical comprehends unsubstituted-benzyl, (lower alkylated)-benzyl, (lower alkoxylated)-benzyl, halogenated-benzyl, nitrobenzyl, e. g., benzyl, 4-methylbenzyl, 4-n-butylbenzyl, 2,4-dimethylbenzyl, 3-ethylbenzyl, 3,4,5-trimethylbenzyl, 4-n-butoxybenzyl, 2,4-dimethoxybenzyl, 2,4,6-trimethoxybenzyl, 3,4-diethoxybenzyl, 4-n-hexoxybenzyl, 2-chlorobenzyl, 4-chlorobenzyl, 2,4-dibromobenzyl, 3-iodobenzyl, 3,4-dichlorobenzyl, 2,4,6-trichlorobenzyl, 4-fluorobenzyl, 3-nitrobenzyl and the like. The non-toxic anion, designated as An which can be any anion, for instance, chloride, bromide, iodide, sulfate, benzenesulfonate, para-toluenesulfonate, citrate, tartrate, and the like, has no appreciable pharmacological activity of its own in the high dilutions at which the quaternary ammonium salts as a whole are effective. In particular, the anions appear to contribute nothing to the pharmacological activities which inhere to the substituted-phenanthroline compounds of the present invention.

The quaternary ammonium salts of my invention are prepared by treating my basic phenanthrolines with n molar equivalents of a lower alkyl or a benzyl ester of an acid, either inorganic or organic, such esters having the formula R₃An, such as methyl iodide, methyl bromide, ethyl chloride, ethyl bromide, ethyl sulfate, n-propyl iodide, benzyl chloride, 2-chlorobenzyl chloride, 4-nitrobenzyl chloride, para-chlorobenzyl chloride, methyl para-toluenesulfonate, ethyl para-toluenesulfonate, ethyl benzenesulfonate, and the like, the respective quaternary salts being the methiodides, methobromides, ethochlorides, ethobromides, ethosulfates, n-propiodides, benzochlorides, 2 - chlorobenzochlorides, 4 - nitrobenzochlorides, para - chlorobenzochlorides, metho - para - toluenesulfonates, etho - para - toluenesulfonates, ethobenzensulfonates, and the like. Using one molar equivalent of quaternizing agent (R₃An) per mole of basic phenanthroline, I obtained my monoquaternary salts (above formula where n is 1); and using two molar equivalents of quaternizing agent per mole of basic phenanthroline, I obtained my diquaternary salts (above formula where n is 2). The use of excess quaternizing agent in any instance tends to produce polyquaternization depending upon the amount of excess quaternizing agent used and the reaction conditions.

Sometimes direct addition of an ester, R₃An, to the 4-substituted-amino-10-hydroxy-1,7-phenanthrolines does not occur readily due to the properties of the particular ester used. This is the case if the anion, An, is derived from a relatively weak acid such as citric acid or tartaric acid. In such cases it is possible by use of metathetical reactions to replace the anion without reconversion to the tertiary amine. This can be effected by treatment of an aqueous solution of the quaternary ammonium salt, Q(An)ₙ, with silver oxide (hydroxide). The silver salt, AgAn, is precipitated, leaving in solution the quaternary ammonium salt, Q(OH)ₙ. It is prerequisite, of course, that the salt AgAn be insoluble in water. The quaternary ammonium hydroxide may then be neutralized with the appropriate acid, HAn', to give any desired salt. For example, methiodides are generally easier to prepare by direct addition than methochlorides. Methyl iodide reacts more readily with tertiary-amines and is more convenient to use than methyl chloride. However, the methochloride can be readily prepared from the methiodide by the method just described. Treatment of a solution of the methiodide with silver oxide precipitates silver iodide leaving a solution of the quaternary ammonium hydroxide. Neutralization of this solution with hydrochloric acid gives the mono- or dimethochloride which can be obtained by concentrating the solution. Similarly, using citric or tartaric acid in place of hydrochloric acid, the respective methocitrates or methotartrates are obtained.

The acid addition salts of my 4-substituted-amino-10-hydroxy-1,7-phenanthrolines are prepared by reacting the basic phenanthrolines with the appropriate inorganic or organic acid, such as hydrochloric, hydrobromic, hydriodic, phosphoric, sulfuric, sulfamic, ethanesulfonic, tartaric, citric, succinic, acetic, benzoic, oleic, and the like, yielding the following respective salts: hydrochlorides, hydrobromides, hydriodides, phosphates, sulfates, sulfamates, ethanesulfonates, tartrates, citrates, succinates, acetates, benzoates, oleates, and the like.

My invention also comprehends the preparation of the 4 - substituted - amino - 10 - hydroxy - 1,7 - phenanthrolines of my invention by heating 4-chloro-10-hydroxy-1,7-phenanthroline with a diamine having the formula H₂N—X—NR₁R₂ where X and NR₁R₂ have the meanings given above. For example, 4 - (6 - diethylaminohexyl-amino - 10 - hydroxy - 1,7 - phenanthroline is prepared by heating 4-chloro-10-hydroxy-1,7-phenanthroline with 6-diethylaminohexylamine.

My invention further comprehends 4-chloro-10-hydroxy-1,7-phenanthroline which can be used in the preparation of my 4-substituted-amino-10-hydroxy-1,7-phenanthrolines as noted in the preceding paragraph and as illustrated hereinafter. 4-chloro-10-hydroxy-1,7-phenanthroline (XI) was prepared from 4,10-dihydroxy-1,7-phenanthroline (X) which was prepared by two different methods as presented graphically in Chart A', where R—all occurrences—stands for lower alkyl, preferably ethyl.

CHART A'

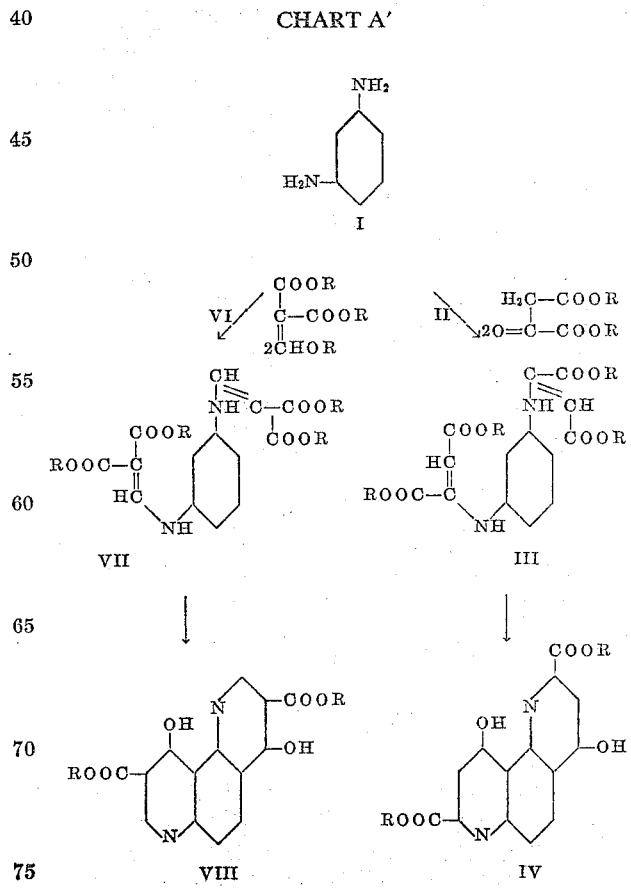

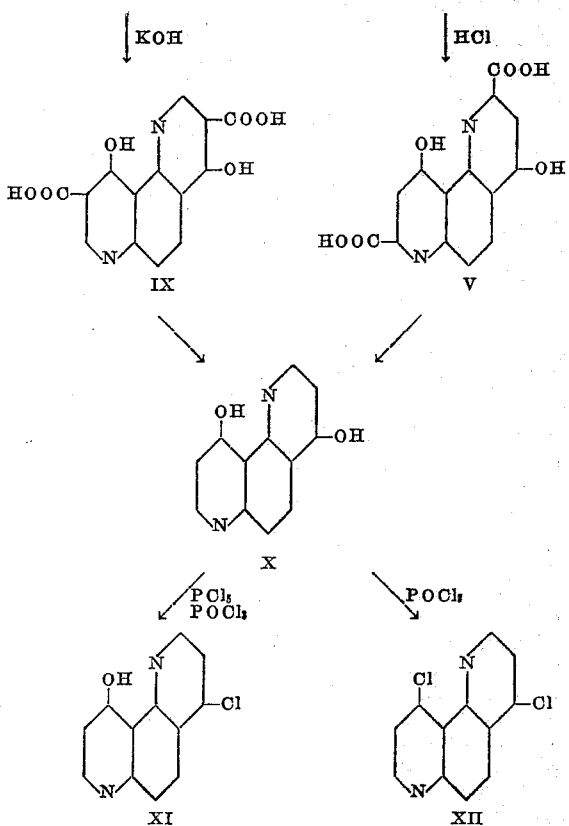

In one method of preparing 4,10-dihydroxy-1,7-phenanthroline (XI), meta-phenylenediamine (I) was heated with ethyl ethoxalyl acetate (II) to yield 1,3-bis(alpha,-beta-dicarbethoxyvinylamino)benzene (III), which yielded 2,8-dicarbethoxy-4,10-dihydroxy - 1,7 - phenanthroline (IV), on cyclization by heating. Hydrolysis of the diester (IV), by refluxing with dilute hydrochloric acid, produced the corresponding dicarboxylic acid (V), which when decarboxylated, by heating in mineral oil at about 320–330° C., resulted in the formation of 4,10-dihydroxy-1,7-phenanthroline (X).

In the second, and preferred, method of preparing 4,10-dihydroxy-1,7-phenanthroline (X), meta-phenylenediamine (I) was condensed with ethyl ethoxymethylenemalonate (VI) to yield meta-bis-(beta,beta-dicarbethoxyvinylamino)-benzene (VII), which when cyclized by heating formed 3,9-dicarbethoxy-4,10-dihydroxy-1,7-phenanthroline (VIII). Decarboxylation of this diester (VIII) by heating with aqueous alkali yielded the corresponding dicarboxylic acid (IX), which when decarboxylated by heating in mineral oil at 320–330° C. resulted in the formation of 4,10-dihydroxy-1,7-phenanthroline (X). The over-all yield by this preferred method was about 70%.

4,10-dihydroxy-1,7-phenanthroline (X) was then converted into 4-chloro-10-hydroxy-1,7-phenanthroline (XI) either directly by treatment of a mixture of phosphorus oxychloride and phosphorus pentachloride or by first preparing 4,10-dichloro-1,7-phenanthroline (XII) by treating the dihydroxy compound with phosphorus oxychloride and hydrolyzing the resulting dichloro compound (XII) by treatment with dilute hydrochloric acid on a steam bath. If in the preparation of the dichloro compound (XII), the reaction mixture was poured into water and (instead of keeping cold) the temperature was allowed to rise to 80° C. for a few minutes, the monochloro compound (XI) was obtained. This appears to be the better method for the preparation of 4-chloro-10-hydroxy-1,7-phenanthroline (XI).

The compounds of my invention are further illustrated by the following examples.

EXAMPLE 1

(A) 4,10-dihydroxy-1,7-phenanthroline (X)

This intermediate dihydroxy compound was prepared by two different procedures as outlined graphically above in Chart A', one procedure embodying the series of reactions that result in the successive formation of Compounds III, IV, V and X, and the other involving Compounds VII, VIII, IX and X. The preparations of all of these compounds are presented in the following paragraphs.

*1,3 - bis(alpha,beta - dicarbethoxyvinylamino)benzene (III)*.—A benzene solution of ethyl ethoxalylacetate was prepared by treating 262 g. (1.25 mole) of the sodium salt, suspended in a well-stirred mixture of 800 ml. of water and 500 ml. of benzene, with 105 ml. (1.25 mole) of concentrated hydrochloric acid. The benzene layer was washed with dilute bicarbonate solution and water and combined with a solution of 54 g. (0.5 mole) of meta-phenylenediamine in 400 ml. of hot benzene. The mixture was heated at 40–50° C. for ten hours under slight vacuum and the benzene and water were allowed to distill slowly. Additional benzene was supplied as needed. The solution was then cooled, filtered and diluted to a volume of 1 liter with fresh benzene and washed with four portions, 130 ml. each, of 3 N hydrochloric acid. This was followed by three washings, 110 ml. each, with 3 N sodium hydroxide, two with 1 N sodium hydroxide and one with water. After drying over anhydrous sodium sulfate, removal of the solvent gave 90 g. (0.2 mole, 40%) of a deep ruby red, viscous oil. This was used directly for cyclization to IV.

An analytically pure sample was obtained by heating the crude product with about eleven times its weight of Skellysolve A, pouring off the supernatant liquid from any undissolved material and filtering the hot solution with charcoal. Cooling in an ice bath and scratching gave beautiful pale yellow needles which on further recrystallization from Skellysolve A gave the product, 1,3-bis-(alpha,beta - dicarbethoxyvinylamino)benzene (III), which melted at 53–54.5° C.; $n_D^{18}$, 1.5815 (supercooled liquid).

*Anal.*—Calcd. for $C_{22}H_{28}N_2O_8$: N, 6.25. Found: N, 6.26.

*2,8-dicarbethoxy-4,10 - dihydroxy - 1,7 - phenanthroline (IV)*.—Cyclization was accomplished in yields ranging from 40–50% by dropping crude III into well-stirred quantities of either Dowtherm (three volumes) or white mineral oil (six volumes) at temperatures of 245–50° C. and holding it at that point for eight to ten minutes. The alcohol which separated was collected by distillation. An atmosphere of nitrogen was helpful in decreasing the amount of decomposition during cyclization. After allowing to cool to 100° C., the precipitate was collected and washed with acetone and ether. The product, 2,8-dicarbethoxy-4,10-dihydroxy - 1,7 - phenanthroline (IV), usually gray or brown in color was purified by slurrying with portions of acetone and then recrystallized from pyridine to give small white leaflets melting at 269.5–270° C. with decomposition.

*Anal.*—Calcd. for $C_{17}H_{16}N_2O_6$: C, 60.67; H, 4.53; N, 7.86. Found: C, 60.77; H, 4.77; N, 7.59.

*2,8 - dicarboxy - 4,10 - dihydroxy - 1,7 - phenanthroline (V)*.—Hydrolysis was easily accomplished by boiling the diester for about half an hour with dilute sodium hydroxide solution. However, on acidification with concentrated hydrochloric acid to Congo red the insoluble mono-sodium salt precipitated. This salt was so insoluble in dilute hydrochloric acid that it resisted the effects of boiling for a long period with 3 N hydrochloric acid. A sample of this salt on further purification analyzed as follows:

*Anal.*—Calcd. for $C_{14}H_7N_2O_6Na$: N, 8.70. Found: N, 8.74, 8.70.

The free acid was prepared in quantitative yield by refluxing IV for eight to ten hours with twelve volumes of 3 N hydrochloric acid, filtering hot and washing the residue with water. The acid was purified by dissolving in aqueous pyridine, treating with charcoal, filtering and precipitating the free acid from a hot solution with excess dilute hydrochloric acid. The dried white acid, 2,8-dicarboxy-4,10-dihydroxy-1,7-phenanthroline (V), melted at 340° C. with decomposition.

*Anal.*—Calcd. for $C_{14}H_8N_2O_6$: N, 9.33. Found: N, 9.81.

*meta-Bis-(beta,beta - dicarbethoxyvinylamino)benzene (VII).*—A mixture of 139 g. (1.29 mole) of m-phenylenediamine (I) and 585 g. (2.7 mole) of ethyl ethoxymethylenemalonate (VI) were mixed together and warmed on a steam bath until homogeneous. After allowing to stand overnight at about 40° C., the resulting white solid cake was warmed on a steam bath with 200 ml. of Skellysolve C until most of the solid had dissolved. The resulting solution was cooled rapidly in an ice bath with stirring to give a slurry of solid which was filtered, washed twice with Skellysolve A and sucked dry. Yields ranged from 92–97%. An analytical sample of this product, meta-bis-(beta,beta-dicarbethoxyvinylamino)-benzene (VIII), was prepared by recrystallization from ethanol; M. P., 109–110° C.

*Anal.*—Calcd. for $C_{22}H_{28}N_2O_2$: N, 6.25. Found: N, 6.34.

*3,9 - dicarbethoxy-4,10-dihydroxy - 1,7 - phenanthroline (VIII).*—Cyclization of VII was accomplished in better than 90% yields by either of the following methods.

One part of VII was added, with efficient stirring, to six volumes of Dowtherm preheated to 240° C. The solution was then heated to reflux and maintained at that point for 20–30 minutes. During this time the mixture became very thick due to the separated product (VIII). The slurry was allowed to cool, diluted with about two volumes of acetone (to aid filtration), filtered, washed with acetone and dried.

The second method used ten volumes of white mineral oil, the heating being carried out at 270–275° C. for fifteen minutes after the addition of VII. Unless an oil bath or a Glas Col heater were used, there was danger of scorching the product as the mass became very thick and efficient stirring was difficult to maintain throughout the course of the reaction.

An analytical sample of this product, 3,9-dicarbethoxy-4,10-dihydroxy-1,7-phenanthroline (VIII), was prepared by refluxing a portion of the product with a large volume of acetone, filtering hot and repeating the procedure on the residue to yield a white powder melting at 314–315° C. with decomposition.

*Anal.*—Calcd. for $C_{18}H_{16}N_2O_6$: N, 7.86. Found: N, 7.93.

*3,9 - dicarboxy - 4,10 - dihydroxy - 1,7 - phenanthroline (IX).*—As this acid also forms a sodium salt which is insoluble in dilute acids, hydrolysis was effected by refluxing one mole of the diester for one hour with three liters of water containing four moles of potassium hydroxide. The hot solution was filtered with charcoal, the filtrate reheated to boiling and the acid thrown out by adding a large excess of concentrated hydrochloric acid. The yield of acid, after removal by filtration, washing with water and drying, was practically quantitative. An analytical sample, prepared from pure diester (VIII) was a white powder melting at 373–74° C.

*Anal.*—Calcd. for $C_{14}H_8N_2O_6$: C, 56.00; H, 2.69; N, 9.33. Found: C, 56.02; H, 2.56; N, 9.53.

*4,10-dihydroxy-1,7-phenanthroline (X).*—This compound was prepared from either V or IX by decarboxylation in white mineral oil (7 volumes) at 320–330° C. for one hour. The yield of crude decarboxylated material was practically quantitative. The reaction was best carried out by using a Glas Col heater in order to prevent decomposition due to local overheating. When pure acid was decarboxylated, little decomposition occurred and the product was light colored. The usual procedure, however, was to use the crude products directly from each of the steps in the series of reactions so that the resulting decarboxylated material was usually tan to dark brown or black in color. The darker-colored product was usually obtained when the acid (V) from the ethyl oxalylacetate method was used while X from the ethoxymethylenemalonic ester method was usually tan colored. The dihydroxyphenanthroline (X) was purified by dissolving in hot dilute sodium hydroxide solution, filtering with charcoal and acidifying the filtrate with acetic acid. The product which separated could be further purified by recrystallization from 30% acetic acid solution (filtered hot with charcoal) to give long silky white needles containing one molecule of water of crystallization. This was removed by drying over phosphorous pentoxide at 140° C. in a vacuum or by vacuum sublimation at 310° C. to give a white solid melting at 390° C.

*Anal.*—Calcd. for $C_{12}H_2N_2O_2$: C, 67.92; H, 3.80; N, 13.20. Found: C, 68.24; H, 3.64; N, 13.37, 13.24.

This product, 4,10-dihydroxy-1,7-phenanthroline (X), is soluble in hot sodium carbonate solution from which the sodium salt crystallizes in the form of needles on cooling.

(B) *4-chloro-10-hydroxy-1,7-phenanthroline (XI)*

A mixture of 5 g. (0.024 mole) of anhydrous X, 12.5 g. of phosphorus pentachloride and 25 ml. of phosphorus oxychloride was refluxed on an oil bath for twenty minutes. Considerable solid separated soon after the initial reaction. The mixture was poured into ice and water, the temperature being held below 10° C. [the reason for maintaining the low temperature in this experiment was to show that the monochloro compound was formed in the reaction and not by hydrolysis of the dichloro compound], and stirred until all the solid had dissolved. After filtering with charcoal, the solution was treated with concentrated ammonium hydroxide (ice added to keep temperature below 25° C.). The product was collected, dissolved in chloroform and the solution dried with Drierite. After distilling off the chloroform, a pale yellow solid was obtained, 4.2 g. (77%). After two recrystallizations from ethanol the product melted, 4-chloro-10-hydroxy-1,7-phenanthroline (XI), at 196–196.5° C. This product is insoluble in sodium hydroxide solution.

*Anal.*—Calcd. for $C_{12}H_7ClN_2O$: Cl, 15.37; N, 12.15. Found: Cl, 15.21; N, 12.06.

*4,10-dichloro-1,7-phenanthroline (XII).*—A mixture of one part by weight of X and two parts by volume of phosphorus oxychloride was heated gently on an oil bath. After the initial exothermic reaction, the mixture was refluxed for thirty minutes. The reaction mixture was poured into ice and water (temperature kept below 30° C.) and worked up as for XI above. Yields up to 80% of 4,10-dichloro-1,7-phenanthroline (XIII) were obtained depending upon the purity of the dihydroxy compound X.

XII was also obtained in about 80% yield by refluxing the chlorohydroxy compound (XI) with five volumes of phosphorus oxychloride for twenty minutes or until solution was effected. This reaction appeared to be greatly speeded up by the addition of a few drops of water or concentrated hydrochloric acid. In one experiment in which anhydrous conditions were maintained, it required four hours of refluxing to effect solution. During this time the mixture became very black and it was possible to isolate only about a 10% yield of XII.

An analytical sample of XII was prepared by recrystallization from Skellysolve C followed by recrystallization from ethanol to give long white needles melting at 155–155.5° C.

*Anal.*—Calcd. for $C_{12}H_6N_2Cl_2$: Cl, 28.47; N, 11.25. Found: Cl, 28.45; N, 10.97.

(C) *4-(3-diethylamino-2-hydroxypropylamino)-10-hydroxy-1,7-phenanthroline*

A mixture of one mole of 4-chloro-10-hydroxy-1,7-phenanthroline, 1.5 moles of 3-diethylamino-2-hydroxypropylamine, phenol (equal in weight to chloro compound), 1.1 moles of ethanolic hydrogen chloride and six volumes of isopropyl alcohol (based on chloro compound) was refluxed with stirring for three hours. The solid 4-(3-diethylamino-2-hydroxypropylamino) - 10 - hydroxy - 1,7-phenanthroline dihydrochloride separated from solution. After cooling, the product was filtered, washed with isopropyl alcohol and ether and dried; yield, 87%. An analytical sampe of the dihydrochloride, prepared from purified base (below) melted at 285–287° C. with decomposition.

Anal.—Calcd. for $C_{19}H_{24}N_4O_2 \cdot 2HCl$: Cl⁻, 17.16. Found: Cl⁻, 17.00.

The reaction between 4-chloro-10-hydroxy-1,7-phenanthroline and 3-diethylamino-2-hydroxypropylamine can also be run by heating the two reactants in the absence of phenol or any solvents, with the product being 4-(3-diethylamino - 2 - hydroxypropylamino) - 10 - hydroxy-1,7 - phenanthroline in its free base form.

The free base was also prepared from the dihydrochloride; it was recrystallized from absolute ethanol. It appears to exist in two crystalline modifications. If the melting point was taken very slowly, the sample started to melt at 162° C. but before fusion was complete it resolidified and remelted at 185–187° C. If the melting point was taken rapidly, it melted completely at 162–163° C. In one instance during recrystallization of a sample, a small amount of alcohol insoluble material was removed by filtration from the hot solution and was found to melt at 185–187° C. Recrystallization of this high melting material from a large volume of absolute ethanol gave only the lower melting material, M. P. 162–163° C.

Anal.—Calcd. for $C_{19}H_{24}N_4O_2$: C, 67.03; H, 7.11; N, 16.46. Found: C, 66.98; H, 7.42; N, 16.60.

EXAMPLE 2

*10 - hydroxy - 4 - [2 - (4 - morpholinyl)ethylamino]-1,7-phenanthroline*

This preparation was carried out following the procedure described for Example 1C using 30 g. of 2-(4-morpholinyl)ethylamine and 25 g. of 4-chloro-10-hydroxy-1,7-phenanthroline. The product, 10-hydroxy-4-[2-(4-morpholinyl)ethylamino]1,7-phenanthroline in the form of its dihydrochloride salt, melted at 320° C. after being purified by dissolving it in water, filtering the aqueous solution after treatment with decolorizing charcoal and adding ethanol to the filtrate to turbidity.

Anal.—Calcd. for $C_{18}H_{20}N_4O_2 \cdot 2HCl$: N, 14.10; Cl⁻, 17.85. Found: N, 14.08; Cl⁻, 17.75.

The product in the form of its free base consisted of small pale yellow platelets and melted at 188.6–189.2° C. (cor.) after recrystallization first from ethanol and then from benzene.

Anal.—Calcd. for $C_{18}H_{20}N_4O_2$: N, 17.27. Found: N, 17.38.

EXAMPLE 3

*4 - [2 - (1 - piperidyl)ethylamino] - 10 - hydroxy - 1,7-phenanthroline*

Following the procedure described for Example 1C using 4.5 g. of 2-(1-piperidyl)ethylamine and 4.0 g. of 4-chloro-10-hydroxy-1,7-phenanthroline, there was obtained 4 - [2 - (1 - piperidyl)ethylamino] - 10 - hydroxy-1,7-phenanthroline, M. P. 168.5–170.4° C. (cor.) when recrystallized from acetonitrile.

Anal.—Calcd. for $C_{19}H_{22}N_4O$: C, 70.78; H, 6.88; N, 17.38. Found: C, 70.48; H, 6.82; N, 17.19.

Following the foregoing procedure but using the appropriate tertiary-aminoalkylamine in place of 2-(1-piperidyl)ethylamine, the following compounds can be obtained: 10 - hydroxy - 4 - [3 - (2 - methyl - 1 - piperidyl)propylamino] - 1,7 - phenanthroline, 4 - [4 - (2, 6 - dimethyl - 1 - piperidyl)butylamino] - 10 - hydroxy-1,7 - phenanthroline, 4 - [6 - (1 - piperidyl)hexylamino]-10 - hydroxy - 1,7 - phenanthroline, 4 - [2 - (2,5-dimethyl - 1 - pyrrolidyl)ethylamino] - 10 - hydroxy - 1,7-phenanthroline and 10 - hydroxy - 4 - [3 - (1 - pyrrolidyl)propylamino]-1,7-phenanthroline.

EXAMPLE 4

A. *4 - (2 - diethylaminoethylamino) - 10 - hydroxy 1,7-phenanthroline*

Following the procedure described above for Example 1C using 5.8 g. of 2-diethylaminoethylamine and 7.3 g. of 4 - chloro - 10 - hydroxy - 1,7 - phenanthroline, there was obtained 4 - (2 - diethylaminoethylamino) - 10 - hydroxy - 1,7 - phenanthroline, M. P. 129.5–131.3° C. (cor.) when recrystallized from acetone.

Anal.—Calcd. for $C_{18}H_{22}N_4O$: C, 69.63; H, 7.15; N, 18.05. Found: C, 69.67; H, 7.16; N, 18.28.

B. *4 - (2 - diethylaminoethylamino) - 10 - hydroxy-1,7-phenanthroline dimethobromide*

In the preparation of this dimethobromide and dimethobromides of other 10-hydroxy-4-(tertiary-aminoalkylamino)-1,7-phenanthrolines of the following examples, the following general procedure was used. The basic phenanthroline was dissolved in hot acetonitrile and the solution filtered. Excess methyl bromide gas was passed into the solution which was then allowed to stand until solid began to appear. In a few of the preparations, methyl bromide gas was bubbled into a refluxing acetonitrile solution of the basic phenanthroline until solid appeared in the refluxing solution; this procedure in refluxing acetonitrile appeared to give better yields of purer products. After the first appearance of solid in either case, the mixture was usually allowed to stand another six to eight hours and the solid was then collected. In a few of the preparations the solid was filtered from the hot reaction mixture but this variation did not increase yield or purity. Most of these dimethobromides retained varying amounts of moisture which could not be removed by drying at elevated temperatures in a vacuum oven. In one instance, the product was decomposed by attempting to dry it at a temperature of 100° C. The dimethobromides usually precipitated in a fairly pure form from the acetonitrile solution, thereby making recrysallization unnecessary in most cases. Actually in most of the preparations recrystallization was avoided since in one or two instances recrystallization resulted in some decomposition and a marked lowering of the purity of the quaternary salt as indicated by the chemical analysis.

Following the general procedure described in the preceding paragraph using 4-(2-diethylaminoethylamino)-10-hydroxy-1,7-phenanthroline, there was obtained 4-(2-diethylaminoethylamino) - 10 - hydroxy - 1,7 - phenanthroline dimethobromide, M. P. 218.7–222.5° C. (cor.) with decomposition when recrystallized from 95% ethanol.

Anal.—Calcd. for $C_{20}H_{28}Br_2N_4O$: Br, 31.93; N. 11.30. Found: $H_2O$, 4.78; Br (dry basis), 32.45; N (dry basis), 10.98.

Following the above procedure but using other 10-hydroxy - 4 - (tertiary - aminoalkylamino) - 1,7 - phenanthrolines in place of 4-(2-diethylaminoethylamino)-10 - hydroxy - 1,7 - phenanthroline, the following quaternary salts can be obtained: 4 - (3 - diethylamino - 2 - hydroxypropylamino) - 10 - hydroxy - 1,7 - phenanthroline dimethobromide, 10 - hydroxy - 4 - [2 - (4 - morpholinyl)ethylamino] - 1,7 - phenanthroline dimethobromide and 4 - [2 - (1 - piperidyl)ethylamino] - 10-hydroxy - 1,7 - phenanthroline dimethobromide.

EXAMPLE 5

A. *4 - (3 - diethylaminopropylamino) - 10 - hydroxy-1,7-phenanthroline*

This preparation was carried out following the procedure described above for Example 1C but using 7.1 g. of 3-diethylaminopropylamine and 8.3 g. of 4-chloro- 10-hydroxy-1,7-phenanthroline. The product melted at 116–117° C. when recrystallized from Skellysolve C.

*Anal.*—Calcd. for $C_{19}H_{24}N_4O$: N, 17.28. Found: N, 16.91.

B. *4 - (3 - diethylaminopropylamino) - 10 - hydroxy - 1,7-phenanthroline dimethobromide*

Following the procedure described above for Example 4B but using 4-(3-diethylaminopropylamino)-10-hydroxy-1,7-phenanthroline, the product obtained was 4-(3-diethylaminopropylamino) - 10 - hydroxy - 1,7 - phenanthroline dimethobromide, M. P. 259.0–263° C. (cor.) with decomposition after trituration with hot isopropanol.

*Anal.*—Calcd. for $C_{21}H_{30}Br_2N_4O$: Br, 31.07; N, 10.89. Found: $H_2O$, 3.79; Br (dry basis), 30.40; N (dry basis), 10.90.

EXAMPLE 6

A. *4 - (4 - diethylaminobutylamino) - 10 - hydroxy - 1,7-phenanthroline*

Following the procedure described above for Example 1C but using 5.8 g. of 4-diethylaminobutylamine and 6.0 g. of 4-chloro-10-hydroxy-1,7-phenanthroline, there was obtained 4-(4-diethylaminobutylamino)-10-hydroxy-1,7-phenanthroline, M. P. 100.2–102.4° C. (cor.) when recrystallized from acetonitrile.

*Anal.*—Calcd. for $C_{20}H_{26}N_4O$: C, 70.99; H, 7.93; N, 16.56. Found: C, 70.72; H, 8.00; N, 16.11.

B. *4 - (4 - diethylaminobutylamino) - 10 - hydroxy - 1,7-phenanthroline dimethobromide*

This preparation was carried out following the procedure described above for Example 4B using 4-(4-diethylamino)-10-hydroxy-1,7-phenanthroline. The product melted at 242–245° C. (cor.) with decomposition.

*Anal.*—Calcd. for $C_{22}H_{32}Br_2N_4O$: Br, 30.25; N, 10.61. Found: $H_2O$, 2.95; Br (dry basis), 30.18; N (dry basis), 10.32.

EXAMPLE 7

A. *4 - (4 - di - n - butylaminobutylamino) - 10 - hydroxy-1,7-phenanthroline*

Following the procedure described above for Example 1C but using 6.95 g. of 4-di-n-butylaminobutylamine and 4.0 g. of 4-chloro-10-hydroxy-1,7-phenanthroline, there was obtained 4-(4-di-n-butylaminobutylamino)10-hydroxy-1,7-phenanthroline, M. P. 86.3–89.5° C. (cor.) when recrystallized from acetonitrile.

*Anal.*—Calcd. for $C_{24}H_{34}N_4O$: C, 73.08; H, 8.69; N, 14.20. Found: C, 73.18; H, 8.68; N, 14.10.

B. *4 - (4 - di - n - butylaminobutylamino) - 10 - hydroxy-1,7-phenanthroline dimethiodide*

The preparation of this dimethiodide and other dialkiodides of 10-hydroxy-4-(tertiary-aminoalkylamino)-1,7-phenanthrolines of the following examples were carried out according to the following general procedure. Excess alkyl iodide was added to a hot solution of the basic phenanthroline in acetonitrile and the resulting solution was refluxed until solid appeared. After the first appearance of solid, the reaction mixture was allowed to stand for 1–2 hours before collecting the product. The same problems of water retention, drying and recrystallization that were experienced with the dimethobromides were found to exist with the dialkiodides. This procedure for the preparation of the dialkiodides can also be employed for the preparation of dialkobromides other than dimethobromides, dialkosulfates, dibenzohalides, dialkotoluenesulfonates, dialkobenzenesulfonates, and the like.

Following the above general procedure using 4-(4-di-n - butylaminobutylamino) - 10 - hydroxy - 1,7 - phenanthroline and methyl iodide, the product obtained was 4-(4-di-n-butylaminobutylamino)-10-hydroxy-1,7-phenanthroline dimethiodide, M. P. 204.1–206.7° C. (cor.).

*Anal.*—Calcd. for $C_{26}H_{40}I_2N_4O$: I, 37.42; N, 8.26. Found: $H_2O$, 4.08; I (dry basis), 37.30; N (dry basis), 8.03.

When the above procedure is followed using n-propyl iodide, isobutyl bromide, benzyl chloride or ethyl para-toluene-sulfonate in place of methyl iodide, there is obtained 4-(4-di-n-butylaminobutylamino)-10-hydroxy-1,7-phenanthroline di-n-propiodide, diisobutobromide, dibenzochloride or dietho-para-toluenesulfonate, respectively.

EXAMPLE 8

A. *4 - (5 - diethylaminopentylamino) - 10 - hydroxy - 1,7-phenanthroline*

This preparation was carried out following the procedure described for Example 1C but using 13.8 g. of 5-diethylaminopentylamine and 10 g. of 4-chloro-10-hydroxy-1,7-phenanthroline. The product melted at 117.6–118.7° C. (cor.) when recrystallized from ethylene dichloride.

*Anal.*—Calcd. for $C_{21}H_{28}N_4O$: C, 71.56; H, 8.01; N, 15.90. Found: C, 71.52; H, 7.95; N, 15.81.

B. *4 - (5 - diethylaminopentylamino) - 10 - hydroxy - 1,7-phenanthroline dimethobromide*

Following the procedure described for Example 4B using the phenanthroline of Example 8A, there is obtained 4-(5-diethylaminopentylamino)-10-hydroxy-1,7-phenanthroline dimethobromide, M. P. 275.8–277.0° C. (cor.) with decomposition.

*Anal.*—Calcd. for $C_{23}H_{34}Br_2N_4O$: Br, 29.47; N, 10.33. Found: $H_2O$, 0.75; Br (dry basis), 29.30; N (dry basis), 10.10.

EXAMPLE 9

A. *4 - (6 - diethylaminohexylamino) - 10 - hydroxy - 1,7-phenanthroline*

This compound was prepared following the procedure described above for Example 1C using 5.2 g. of 6-diethylaminohexylamine and 5.0 g. of 4-chloro-10-hydroxy-1,7-phenanthroline. It melted at 118.2–120.4° C. (cor.) when recrystallized from acetone.

*Anal.*—Calcd. for $C_{22}H_{30}N_4O$: C, 72.10; H, 8.25; N, 15.29. Found: C, 71.80; H, 8.40; N, 15.31.

B. *4 - (6 - diethylaminohexylamino) - 10 - hydroxy - 1,7-phenanthroline dimethobromide*

Following the procedure described above for Example 4B using the phenanthroline derivative of Example 9A, there was obtained 4-(6-diethylaminohexylamino)-10-hydroxy-1,7-phenanthroline dimethobromide, M. P. 273.5–274.5° C. (cor.) with decomposition.

*Anal.*—Calcd. for $C_{24}H_{36}Br_2N_4O$: C, 51.70; H, 6.30; Br, 28.82. Found: C, 51.66; H, 6.31; Br, 29.10.

Additional quaternary derivatives of 4-(6-diethylaminohexylamino)-10-hydroxy-1,7-phenanthroline can be obtained by following the procedure described above for Example 7B using methyl iodide, ethyl bromide, n-propyl iodide, isobutyl bromide, benzyl chloride or ethyl para-toluenesulfonate. The following respective quaternary salts are thereby obtained: 4-(6-diethylaminohexylamino)- 10- hydroxy- 1,7- phenanthroline dimethiodide, diethobromide, di-n-propiodide, diisobutobromide, dibenzochloride, or dietho-para-toluenesulfonate.

EXAMPLE 10

A. *4-[3-(N-ethyl-N-2-hydroxyethylamino)propylamino]-10-hydroxy-1,7-phenanthroline*

This basic phenanthroline was prepared following the procedure described for Example 1C using 6.4 g. of 3-(N-ethyl-N-2-hydroxyethylamino)propylamine and 5.0 g. of 4-chloro-10-hydroxy-1,7-phenanthroline. The resulting compound melted at 109–111° C. when recrystallized from benzene.

*Anal.*—Calcd. for $C_{19}H_{24}N_4O_2$: N, 16.48. Found: N, 16.80.

Additional 4- [(N- alkyl- N- beta- hydroxyalkylamino)- alkylamino]-10-hydroxy-1,7-phenanthrolines can be prepared following the above procedure using the appropriate (N-alkyl-N-beta-hydroxyalkylamino)alkylamine in place of 3- (N- ethyl- N- 2- hydroxyethylamino)propylamine. Thus, using 2- (N- methyl- N- 2- hydroxypropylamino)- ethylamine, 4- (N- ethyl- N- 2- hydroxybutylamino)butylamine or 6-(N-ethyl-N-2-hydroxyethylamino)hexylamine there can be obtained 4-[2-(N-methyl-N-2-hydroxypropylamino)ethylamino] - 10 - hydroxy - 1,7 - phenanthroline, 4- [4- (N- ethyl- N- 2-hydroxybutylamino)butylamino]-10-hydroxy-1,7-phenanthroline or 4-[6-(N-ethyl- N- 2- hydroxyethylamino)hexylamino]- 10- hydroxy- 1,7- phenanthroline.

B. 4-[3-(N-ethyl-N-2-hydroxyethylamino)propylamino]- 10-hydroxy-1,7-phenanthroline dimethiodide This quaternary salt was prepared following the procedure described for Example 7B using 4-[3-(N-ethyl-N-2- hydroxyethylamino)propylamino]- 10- hydroxy- 1,7- phenanthroline. The product melted at 252.7–258.0° C. (cor.).

*Anal.*—Calcd. for $C_{21}H_{30}I_2N_4O_2$: I, 40.56; N, 8.97. Found: I, 39.83; N, 9.11.

Additional compounds that can be prepared following the above procedure include the following: 4-[2-(N-methyl- N- 2- hydroxypropylamino)ethylamino]- 10 - hydroxy-1,7-phenanthroline dimethiodide, 4-[4-(N-ethyl- N- 2- hydroxybutylamino)butylamino]- 10- hydroxy- 1,7- phenanthroline dibenzochloride and 4-[6-(N-ethyl-N-2- hydroxyethylamino)hexylamino] - 10 - hydroxy - 1,7- phenanthroline diisobutobromide.

EXAMPLE 11

A. 4 - [3 - (3 - diethylaminopropoxy)propylamino] - 10- hydroxy-1,7-phenanthroline This compound was prepared following the procedure described for Example 1C using 15.6 g. of 3-(3-diethylaminopropoxy)propylamine [described by Whitmore et al. JACS 66, 725 (1944)] and 10.0 g. of 4-chloro-10- hydroxy-1,7-phenanthroline. It melted at 106.7–109.4° C. (cor.) when recrystallized from acetonitrile.

*Anal.*—Calcd. for $C_{22}H_{30}N_4O_2$: C, 69.08; H, 7.90; N, 14.64. Found: C, 69.06; H, 7.88; N, 14.56.

Additional compounds that can be prepared according to the above procedure using the appropriate dialkylaminoalkoxyalkylamine are 4-[4-(4-diethylaminobutoxy)- butylamino]-10-hydroxy-1,7-phenanthroline and 4-[4-(3- diethylaminopropoxy)pentylamino] - 10 - hydroxy - 1,7 - phenanthroline.

B. 4- [3- (3- diethylaminopropoxy)propylamino]- 10- hydroxy-1,7-phenanthroline dimethobromide This preparation was carried out according to the procedure described for Example 4B. The product melted at 236.5–237.9° C. (cor.).

*Anal.*—Calcd. for $C_{24}H_{36}Br_2N_4O_2$: Br, 27.96; N, 9.80. Found: $H_2O$, 2.05; Br (dry basis), 27.30; N (dry basis), 9.92.

C. 4 - [3 - (3 - diethylaminopropoxy)propylamino] - 10- hydroxy-1,7-phenanthroline diethiodide This quaternary ammonium salt was prepared according to the procedure described for Example 7B. The product melted at 201.7–204.5° C. (cor.).

*Anal.*—Calcd. for $C_{26}H_{40}I_2N_4O_2$: I, 36.52; N, 8.07. Found: I, 36.36; N, 8.05.

Additional compounds that can be prepared according to the foregoing procedure are 4-[4-(4-diethylaminobutoxy)butylamino]-10-hydroxy-1,7-phenanthroline dimethiodide and 4-[4-(3-diethylaminopropoxy)-pentylamino]-10-hydroxy-1,7-phenanthroline diethiodide.

EXAMPLE 12

A. 4 - [3 - (2 - dimethylaminoethoxy)propylamino] - 10- hydroxy-1,7-phenanthroline This preparation was carried out according to the procedure described for Example 1C using 6.4 g. of 3-(2-dimethylaminoethoxy)propylamine. [This compound was prepared according to the procedure described by Whitmore et al., JACS 66, 725 (1944). It distilled at 86–88° C. at 12 mm., had an $n_D^{25}$ of 1.4411 and analyzed as follows: Calcd. for $C_7H_{18}N_2O$: N (basic nitrogen), 19.17. Found N, 18.75] and 5.0 g. of 4-chloro-10-hydroxy-1,7- phenanthroline. The product, 4-[3-(2-dimethylaminoethoxy)propylamino]- 10- hydroxy- 1,7- phenanthroline, melted at 128–130° C. when recrystallized from acetonitrile.

*Anal.*—Calcd. for $C_{19}H_{24}N_4O_2$: N, 16.45. Found: N, 16.18.

B. 4- [3- (2- dimethylaminoethoxy)propylamino]- 10- hydroxy-1,7-phenanthroline dimethiodide This quaternary ammonium salt was prepared according to the procedure described for Example 7B. It melted at 262.5–266.3° C. (cor.).

*Anal.*—Calcd. for $C_{21}H_{30}I_2N_4O_2$: I, 40.56; N, 8.97. Found: I, 40.00; N, 8.73.

EXAMPLE 13

A. 4 - [3 - (2 - diethylaminoethoxy)propylamino] - 10- hydroxy-1,7-phenanthroline This compound was prepared following the procedure described for Example 1C using 7.0 g. of 3-(2-diethylaminoethoxy)propylamine [described by Whitmore et al. ibid.] and 5.0 g. of 4-chloro-10-hydroxy-1,7-phenanthroline. It melted at 95–96° C. when recrystallized from benzene-Skellysolve B.

*Anal.*—Calcd. for $C_{21}H_{28}N_4O_2$: N, 15.25. Found: N, 15.51.

B. 4-[3-(2-diethylaminoethxy)propylamino]-10- hydroxy-1,7-phenanthroline dimethobromide This compound was prepared following the procedure described for Example 4B using 4-[3-(2-diethylaminoethoxy)propylamino]-10-hydroxy - 1,7 - phenanthroline. It melted at 248.9–253.1° C. (cor.) with decomposition.

*Anal.*—Calcd. for $C_{23}H_{34}Br_2N_4O_2$: Br, 28.66; N, 10.05. Found: Br, 28.13; N, 10.31.

EXAMPLE 14

A. 4-<3-[2-(1-piperidyl)ethoxy]propylamino>-10- hydroxy-1,7-phenanthroline

This basic phenanthroline was prepared according to the procedure described for Example 1C using 9.3 g. of 3-[2-(1-piperidyl)ethoxy]-propylamine [This intermediate compound, which was prepared according to the procedure described by Whitmore et al. ibid., distilled at 133–134° C. at 12 mm., had an $n_D^{25}$ of 1.4719 and analyzed as follows: Calcd. for $C_{10}H_{22}N_2O$: N (basic nitrogen), 15.04. Found: N, 14.92.] and 5.75 g. of 4-chloro-10-hydroxy-1,7-phenanthroline. It melted at 142.8–144.0° C. (cor.) when recrystallized from acetonitrile.

*Anal.*—Calcd. for $C_{22}H_{28}N_4O_2$: C, 69.43; H, 7.42; N, 14.72. Found: C, 69.08; H, 7.63; N, 14.52.

Additional compounds that can be prepared according to the foregoing procedure using the appropriate intermediates are: 4-<3-[3-(2-methyl-1-piperidyl)propoxy] propylamino>-10-hydroxy - 1,7-phenanthroline, 4-<3-[2- (1-pyrrolidyl)ethoxy]propylamino> - 10 - hydroxy-1,7- phenanthroline, 4 - <3-[3-(4-morpholinyl)-propoxy]propylamino> - 10 - hydroxy-1,7-phenanthroline and 4-<4- [4-(2,5-dimethyl-1-pyrrolidyl)butoxy]butylamino> - 10- hydroxy-1,7-phenanthroline.

B. 4-<3[2-(1-piperidyl)ethoxy]propylamino>-10- hydroxy-1,7-phenanthroline dimethiodide This quaternary ammonium salt was prepared according to the procedure described for Example 7B using 4-<3-[2-(1-piperidyl)ethoxy]-propylamino> - 10 - hydroxy-1,7-phenanthroline. It melted at 195.4–198.4° C. (cor.).

*Anal.*—Calcd. for $C_{24}H_{34}I_2N_4O_2$: I, 38.20; N, 8.43. Found: $H_2O$, 3.24; I (dry basis), 38.10; N (dry basis), 8.25.

Additional quaternary ammonium salts that can be prepared according to the foregoing procedure using the appropriate alkyl or benzyl salt are: 4-<3-[3-(2-methyl-1-piperidyl)propoxy]-propylamino> - 10 - hydroxy - 1,7-phenanthroline di-n-propiodide, 4-<3-[2-(1-pyrrolidyl)-ethoxy]propylamino>-10-hydroxy - 1,7 - phenanthroline diisobutobromide, 4-<3-[-(4-morpholinyl)propoxy]-propylamino>-10-hydroxy-1,7 - phenanthroline dibenzochloride and 4-<4-[4 - (2,5 - dimethyl-1-pyrrolidyl)butoxy]butylamino>-10-hydroxy - 1,7 - phenanthroline diethopara-toluenesulfonate.

EXAMPLE 15

A. *4-[3-(2-di-n-butylaminoethoxy)propylamino]-10-hydroxy-1,7-phenanthroline*

This compound was prepared according to the procedure described in Example 1C using 8.0 g. of 3-(2-di-n-butylaminoethoxy)propylamine [This compound, which was prepared according to the procedure described by Whitmore et al. ibid., distilled at 103–105° C. at 0.65 mm., had an $n_D^{25}$ of 1.4471 and analyzed as follows: $C_{13}H_{20}N_2O$: N (basic nitrogen), 12.17. Found: N, 11.97] and 4.0 g. of 4-chloro-10-hydroxy-1,7-phenanthroline. It melted at 102–103° C. when recrystallized from acetonitrile.

*Anal.*—Calcd. for $C_{25}H_{36}N_4O_2$: N, 13.19. Found: N, 13.14.

B. *4-[3-(2-di-n-butylaminoethoxy)propylamino]-10-hydroxy-1,7-phenanthroline dimethiodide*

This compound is prepared according to the procedure described for Example 7B by treating 4-[3-(2-di-n-butylaminoethoxy)-propylamino]-10-hydroxy - 1,7 - phenanthroline with methyl iodide.

EXAMPLE 16

A. *N-benzyl-N-methylpentylenediamine*

This compound was prepared by heating delta-chlorovaleronitrile with N-methylbenzylamine and reducing the resulting delta-(N-benzyl-N-methylamino)valeronitrile as follows: 28.3 g. of delta-chlorovaleronitrile and 58 g. of N-methylbenzylamine were dissolved in 100 cc. of xylene and refluxed with stirring for three hours. The resulting N-methylbenzylamine hydrochloride (25 g.) was filtered off and washed with xylene. The xylene was removed from the filtrate by distillation in vacuo and the product distilled at reduced pressure to yield 27.5 g. of delta-(N-benzyl-N-methylamino)valeronitrile, B. P. 126–129° C. at 0.3 mm.; $n_D^{25}$, 1.5077.

*Anal.*—Calcd. for $C_{13}H_{18}N_2$: N, 13.86. Found: N, 13.14.

5-(N-benzyl-N-methylamino)pentylamine was then prepared by reducing delta-(N-benzyl-N-methylamino) valeronitrile according to the procedure described by Whitmore et al., ibid. It distilled at 107–109° C. at 0.5 mm.; $n_D^{25}$, 1.5100.

*Anal.*—Calcd. for $C_{13}H_{22}N_2$: N, 13.58. Found: N, 13.31.

Additional compounds that can be prepared following the foregoing procedure are N-ethyl-N-(4-methylbenzyl)ethylenediamine, N-n-butyl-N-(4-chlorobenzyl)butylenediamine, N-ethyl - N - (3,4-dibromobenzyl)hexylenediamine, N-ethyl-N-(3-ethoxybenzyl)-hexylenediamine, N-methyl-N-(3,4-dimethoxybenzyl)octylenediamine and N-ethyl-N-(3,4,5-trimethoxybenzyl)hexylenediamine.

B. *4-[5-(benzyl-N-methylamino)pentylamino]-10-hydroxy-1,7-phenanthroline*

This basic phenanthroline was prepared following the procedure described for Example 1C using 7.15 g. of N-benzyl-N-methylpentylenediamine and 4.0 g. of 4-chloro-10-hydroxy-1,7 - phenanthroline. It melted at 153.5–155.4° C. (cor.) when recrystallized from acetonitrile.

*Anal.*—Calcd. for $C_{25}H_{28}N_4O$: C, 74.96; H, 7.05; N, 13.99. Found: C, 75.12; H, 6.86; N, 13.85.

Additional compounds that can be prepared according to the foregoing procedure include the following: 4-<2-[N-ethyl - N - (4-methylbenzyl)amino]ethylamino>-10-hydroxy-1,7-phenanthroline, 4-<4-[N-n-butyl - N - (4-chlorobenzyl)amino]butylamino> - 10 - hydroxy - 1,7-phenanthroline, 4-<6-[N-ethyl-N-(3,4 - dibromobenzyl)amino]-hexylamino>-10-hydroxy - 1,7-phenanthroline, 4-<6-[N-ethyl-N-(3 - ethoxybenzyl)amino]hexylamino>-10-hydroxy - 1,7 - phenanthroline, 4-<8-[N-methyl-N-(3,4-dimethoxybenzyl)amino]octylamino>-10 - hydroxy-1,7-phenanthroline and 4-<6-[N-ethyl-N-(3,4,5-trimethoxybenzyl)amino]hexylamino>-10-hydroxy - 1,7 - phenanthroline.

C. *4-[5-(N-benzyl-N-methylamino)pentylamino]-10-hydroxy-1,7-phenanthroline dimethiodide*

This quaternary ammonium salt was prepared according to the procedure described for Example 7B. It melted at 228.3–230.3° C. (cor.).

*Anal.*—Calcd. for $C_{27}H_{34}I_2N_4O$: I, 37.08; N, 8.18. Found: $H_2O$, 2.18; I (dry basis), 36.80; N (dry basis), 8.18.

Additional compounds that can be prepared according to the foregoing procedure include the following: 4 - <2 - [N - ethyl - N - (4 - methylbenzyl)amino]ethylamino> - 10 - hydroxy - 1,7 - phenanthroline dimethiodide, 4 - <4 - [N - n - butyl - N - (4 - cholorobenzyl) amino]butylamino> - 10 - hydroxy - 1,7 - phenanthroline di-n - propiodide, 4 - <6 - [N - ethyl - N - (3,4 - dibromobenzyl)amino]hexylamino> - 10 - hydroxy - 1,7 - phenanthroline diisobutobromide, 4 - <6 - [N - ethyl - N - (3 - ethoxybenzyl)amino] - hexylamino> - 10 - hydroxy-1,7 - phenanthroline dibenzochloride, 4 - <8 - [N - methyl - N - (3,4 - dimethoxybenzyl)amino]octyl - amino> - 10 - hydroxy - 1,7 - phenanthroline dietho - para - toluenesulfonate and 4 - <6 - [N - ethyl - N - (3,4,5 - trimethoxybenzyl)amino]hexylamino> - 10 - hydroxy - 1,7 - phenanthroline dimethobromide.

EXAMPLE 17

A. *3-[(N-benzyl-N-alkylamino)alkoxy]propylamines*

These compounds were prepared according to the following series of reactions:

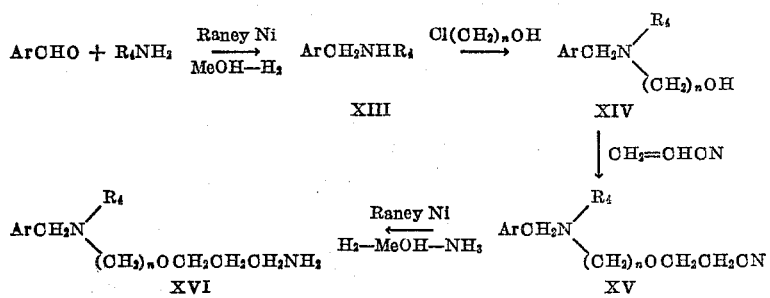

where R₄ is a lower alkyl radical having one to six carbon atoms (like R₁ or R₂ as defined and illustrated hereinabove), $n$ is 2 to 5 inclusive and Ar is selected from the group consisting of phenyl, (lower alkylated-phenyl), lower alkoxylated-phenyl and halogenated-phenyl as described hereinbefore and further illustrated hereinafter. Preparations of compounds XIII, XIV, XV and XVI are given in the following paragraphs.

*N-benzyl-N-alkylamines (XIII).*—To one mole of the aldehyde dissolved in ethanol there was added with ice bath cooling 3 moles of an aqueous solution of the amine. The resulting Schiff base was not isolated but was reduced with Raney nickel catalyst at 60° C., 1000 pounds pressure for five hours. The catalyst was removed by filtration and the alcohol by distillation under vacuo. The aqueous residue was made basic with solid Na₂CO₃ and the organic layer extracted with benzene. The benzene was removed by distillation and the product was obtained by distillation of the residue at reduced pressure. Yields were usually between 60% and 65%. Illustrative of N-benzyl-N-alkylamines prepared by this procedure are the following: N-benzyl-N-methylamine, N-benzyl-N-ethylamine, N-(2-methoxybenzyl)-N-methyl-amine, N-(2-methoxybenzyl)-N-ethylamine [distills at 147–149° C. at 40 mm. and has an $n_D^{25}$ of 1.5208; *Anal.*—Calcd. for C₁₀H₁₅NO: N, 8.48. Found: 8.13], N-(2,3-dimethoxybenzyl)-N-methylamine [distills at 95–98° C. at 0.5 mm. and has an $n_D^{25}$ of 1.5225; *Anal.*—Calcd. for C₁₀H₁₅NO₂: N, 7.74. Found: N, 7.28], N-(2,3-dimethoxybenzyl)-N-ethylamine [distills at 115–117° C. at 2.0 mm. and has an $n_D^{25}$ of 1.5188; *Anal.*—Calcd. for

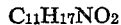

N, 7.17. Found: N, 6.97] and N-(2-chlorobenzyl)-N-methylamine. Additional N-benzyl-N-alkylamines that can be prepared by this procedure are: N-(4-ethoxybenzyl)-N-ethylamine, N-(3,4-dimethoxybenzyl)-N-n-butylamine, N-(3,4,5-trimethoxybenzyl)-N-n-hexylamine, N-(3,4-diethylbenzyl)-N-isobutylamine, N-(4-chlorobenzyl)-N-ethylamine, N-(3,4-dibromobenzyl)-N-ethylamine, and the like.

*N-benzyl-N-alkyl-N-(2-hydroxyethyl)amines (XIV).*—Two moles of the appropriate N-benzyl-N-alkylamine (XIII) and one mole of ethylene chlorohydrin were dissolved in 3–4 volumes of dry toluene and refluxed with stirring for four hours. The solid N-benzyl-N-alkylamine hydrochloride which had separated was collected and washed with toluene. The solvent was removed from the filtrate by distillation and the product obtained from the residue by distillation under reduced pressure. Yields were 70–75%. In some of the preparations where the N-benzyl-N-alkylamine hydrochloride did not separate as a solid, 35% aqueous sodium hydroxide solution was added and the organic layer separated. The organic layer was then worked up as described above and the excess N-benzyl-N-alkylamine was separated from the product by fractional distillation at reduced pressure. Illustrative of N-benzyl-N-alkyl-N-(2-hydroxyethyl)-amines prepared by this precedure are the following: N-benzyl - N - methyl - N - (2 - hydroxyethyl)amine [distills at 136–138° C. at 16 mm. and has an $n_D^{25}$ of 1.5245; *Anal.*—Calcd. for C₁₀H₁₅NO: N, 8.48. Found: N, 8.34], N - benzyl - N - ethyl - N - (2 - hydroxyethyl) - amine [distills at 106–108° C. at 1.5 mm. and has an $n_D^{25}$ of 1.5181; *Anal.*—Calcd. for C₁₁H₁₇NO: N, 7.81. Found: N, 7.76], N - (2 - methoxybenzyl) - N - methyl - N - (2 - hydroxyethyl)amine [distills at 102–105° C. at 0.2 mm. and has an $n_D^{25}$ of 1.5312; *Anal.*—Calcd. for C₁₁H₁₇NO₂: N, 7.34. Found: N, 7.34], N - (2 - methoxybenzyl) - N - ethyl - N - (2 - hydroxyethyl)amine [distills at 107–110° C. at 0.6 mm. and has an $n_D^{25}$ of 1.5220; *Anal.*—Calcd. for C₁₂H₁₉NO₂: N, 6.69. Found: N, 6.73], N - (2,3 - dimethoxybenzyl) - N - methyl - N - (2 - hydroxyethyl)amine [distills at 144–148° C. at 1.5 mm. and has an $n_D^{25}$ of 1.5261; *Anal.*—Calcd. for C₁₂H₁₉NO₃: N, 6.22. Found: N, 6.20], N-(2,3 - dimethoxybenzyl) - N - ethyl - N - (2 - hydroxyethyl)amine [distills at 141-144° C. at 0.7 mm. and has an $n_D^{25}$ of 1.5211; *Anal.*—Calcd. for C₁₃H₂₁NO₃: N, 5.85. Found: N, 5.93], N - (2 - chlorobenzyl) - N - methyl - N - (2 - hydroxyethyl)amine [distills at 116–118° C. at 0.8 mm. and has an $n_D^{25}$ of 1.5394; *Anal.*—Calcd. for C₁₀H₁₄ClNO: N. 7.01. Found: N, 6.97]. Additional N - benzyl - N - alkyl - N - (2 - hydroxyethyl)-amines that can be prepared by this procedure are: N-(4 - ethoxybenzyl) - N - ethyl - N - (2 - hydroxyethyl) - amine, N - (3,4 - dimethoxybenzyl) - N - n - butyl - N - (2 - hydroxyethyl)amine, N - (3,4,5 - trimethoxybenzyl) - N - n - hexyl - N - (2 - hydroxyethyl)amine, N - (3,4 - diethylbenzyl) - N - isobutyl - N - (2 - hydroxyethyl)amine, N - 4 - chlorobenzyl - N - ethyl - N - (2 - hydroxyethyl)amine, N - (3,4 - dibromobenzyl) - N - ethyl - N - (2 - hydroxyethyl)amine, and the like. Other N - benzyl - N - alkyl - N - (hydroxyalkyl)amines that can be prepared following the above procedure using other alkylene halohydrins in place of ethylene chlorohydrin are: N - benzyl - N - methyl - N - (3 - hydroxypropyl) - amine, N - (4 - methoxybenzyl) - N - ethyl - N - (4 - hydroxybutyl)amine, N - (3,4 - dichlorobenzyl) - N - ethyl - N - (5 - hydroxypentyl)amine, and the like.

*beta-[(N-benzyl - N - alkylamino)alkoxy]propionitriles (XV).*—These compounds were prepared from the appropriate N-benzyl-N-alkyl-N-(hydroxyalkyl)amine (XIV) and acrylonitrile according to the procedure of Whitmore et al., ibid. Yields were usually about 70%. Illustrative of beta-[2-(N-benzyl-N-alkylamino)-ethoxy]propionitriles prepared by this procedure are the following: beta-[2-(N-benzyl-N - methylamino)ethoxy]propionitrile [distills at 147–149° C. at 0.5 mm. and has an $n_D^{25}$ of 1.5061; *Anal.*—Calcd. for C₁₃H₁₈N₂O; N, 12.83. Found: N, 12.54], beta-[2-(N-benzyl-N-ethylamino)ethoxy]propionitrile [distills at 147–149° C. at 0.5 mm. and has an $n_D^{25}$ of 1.5002; *Anal.*—Calcd. for C₁₄H₂₀N₂O: N, 12.06. Found: N, 11.69], beta-[2-(N-2-methoxybenzyl-N-methylamino)ethoxy]propionitrile [distills at 160–164° C. at 0.9 mm. and has an $n_D^{25}$ of 1.5142; *Anal.*—Calcd. for C₁₄H₂₀N₂O₂: N, 11.28. Found: 11.44], beta-[2-(N-2-methoxybenzyl-N-ethylamino)ethoxy]propionitrile [distills at 145-147° C. at 0.1 mm. and has an $n_D^{25}$ of 1.5008; *Anal.*—Calcd. for C₁₅H₂₂N₂O₂: N, 10.67. Found: N, 11.08], beta-[2-(2,3-dimethoxybenzyl-N-methylamino)-ethoxy]propionitrile [distills at 166–170° C. at 0.2 mm. and has an $n_D^{25}$ of 1.5137; *Anal.*—Calcd. for C₁₅H₂₂N₂O₃: N, 10.07. Found: N, 9.75], beta-[2-(2,3-dimethoxybenzyl-N-ethylamino)ethoxy]-propionitrile [distills at 158–161° C. at 0.05 mm. and has an $n_D^{25}$ of 1.5083; *Anal.*—Calcd. for C₁₆H₂₄N₃O₂: N, 9.58. Found: N, 9.69] and beta-[2-(N-2-chlorobenzyl-N-methylamino)ethoxy]-propionitrile [distills at 165–166° C. at 0.7 mm. and has an $n_D^{25}$ of 1.5198; *Anal.*—Calcd. for

N, 11.09. Found: N, 11.08]. Additional beta-[(N-benzyl-N-alkylamino)alkoxy]propionitriles that can be prepared by this procedure are: beta-[2-(N-4-ethoxybenzyl-N-ethylamino)ethoxy]propionitrile, beta-[2-(N-3,4-dimethoxybenzyl-N - n - butylamino)ethoxy]propionitrile, beta-[2 - (N - 3,4,5 - trimethoxybenzyl - N-n-hexylamino)ethoxy]propionitrile, beta - [2 - (N - 3,4 - diethylbenzyl-N-isobutylamino)ethoxy]propionitrile, beta-[2(N-4-chlorobenzyl-N-ethylamino)ethoxy]propionitrile, beta-[2-(N-3,4-dibromobenzyl-N-ethylamino)ethoxy]propionitrile, beta-[3-(N-benzyl - N - methylamino)propoxy]-propionitrile, beta-[4-(N-4-methoxybenzyl-N-ethylamino)-butoxy]-propionitrile, beta-[5-(N-3,4-dichlorobenzyl-N-ethylamino)-pentoxy]propionitrile, and the like.

*3 - [(N - benzyl - N - alkylamino)alkoxy]propylamines (XVI).*—These compounds were prepared by reduction of the corresponding beta-[(N-benzyl-N-alkylamino)-alkoxy]propionitriles (XV) with Raney nickel according to the method of Whitmore et al., ibid, except that 6–7 moles of methanolic ammonia was used as the solvent to increase the yield of the products, which were usually from 75–80%. Illustrative of 3-[(N-benzyl-N-alkylamino)alkoxy]propylamines prepared by this procedure are the following: 4-[2-(N-benzyl-N-methylamino)-ethoxy]propylamine [distills at 138–140° C. at 0.6 mm. and has an $n_D^{25}$ of 1.5080; *Anal.*—Calcd. for $C_{13}H_{22}N_2O$: N, 12.60. Found: N, 12.49], 3-[2-(N-benzyl-N-ethyl)-ethoxy]propylamine [distills at 128–131° C. at 0.7 mm. and has an $n_D^{25}$ of 1.5045; *Anal.*—Calcd. for $C_{14}H_{24}N_2O$: N, 11.85. Found: N, 10.79 (sufficiently pure for next step)], 3 - [2 - (N - 2 - methoxybenzyl-N-methylamino)-ethoxy]propylamine [distills at 148–151° C. at 0.4 mm. and has an $n_D^{25}$ of 1.5170; *Anal.*—Calcd. for $C_{14}H_{24}N_2O_2$: N, 11.10. Found: 10.98], 3-[2-(N-2-methoxybenzyl-N-ethylamino)ethoxy]propylamine [distills at 143–145° C. at 0.2 mm. and has an $n_D^{25}$ of 1.5098; *Anal.*—Calcd. for $C_{15}H_{26}N_2O_2$: N, 10.92. Found: N, 10.59], 3-[2-(N-2,3-dimethoxybenyl - N - methylamino)ethoxy]propylamine [distills at 153–156 at 0.3 mm. and has an $n_D^{25}$ of 1.5130; *Anal.*—Calcd. for $C_{15}H_{26}N_2O_3$: N, 9.92. Found: N, 9.84], 3 - [2 - (N - 2,3-dimethoxybenzyl-N-ethylamino)-ethoxy]propylamine [distills at 150–153° C. at 1.0 mm. and has an $n_D^{25}$ of 1.5112; *Anal.*—Calcd. for $C_{16}H_{28}N_2O_3$: N, 9.45. Found: N, 9.47], 3-[2-(N-2-chlorobenzyl-N-methylamino)ethoxy]propylamine [distills at 152–153° C. at 0.8 mm. and has an $n_D^{25}$ of 1.5212; *Anal.*—Calcd. for $C_{13}H_{21}ClN_2O$: N, 10.91. Found: N, 10.86]. Additional 3-[(N-benzyl-N-alkylamino)alkoxy]propylamines that can be prepared by this procedure are: 3-[2-(N-4-ethoxybenzyl-N-ethylamino)ethoxy]propylamine, 3-[2-(N-3,4-dimethoxybenzyl-N-n-butylamino)ethoxy]propylamine, 3-[2-(N-3,4,5-trimethoxybenzyl-N-n-hexylamino)-ethoxy]propylamine, 3 - [2 - (N-3,4-diethylbenzyl-N-isobutylamino)ethoxy]propylamine, 3-[2-(N-4-chlorobenzyl-N-ethylamino)ethoxy]propylamine, 3-[2-(N-3,4-dibromobenzyl-N-ethylamino)ethoxy]propylamine, 3-[3-(N-benzyl-N-methylamino)propoxy]propylamine, 3 - [4 - (N-4-methoxybenzyl-N-ethylamino)butoxy]propylamine, 3-[5-(N-3,4-dichlorobenzyl - N - ethylamino)pentoxy] - propylamine, and the like.

B. *4-<3-[2-(N-benzyl-N - methylamino)ethoxy]propyl-amino>-10-hydroxy-1,7-phenanthroline*

This compound was prepared following the procedure described for Example 1C using 9.75 g. of 3-[2-(N-benzyl-N-methylamino)ethoxy]propylamine and 5.0 g. of 4-chloro - 10 - hydroxy - 1,7-phenanthroline. It melted at 113.2–115.2° C. when recrystallized from acetonitrile.

*Anal.*—Calcd. for $C_{25}H_{28}N_4O_2$: C, 72.10; H, 6.78; N, 13.46. Found: C, 71.80; H, 6.55; N, 13.45.

Additional compounds that can be prepared according to the foregoing procedure using the appropriate diamine sidechain are: 4-<3-[3-(N-benzyl-N-methylamino)propoxy]propylamino> - 10 - hydroxy - 1,7 - phenanthroline, 4 - <3 - [4-(N-ethylbenzyl-N-ethylamino)butoxy]propylamino>-10-hydroxy-1,7-phenanthroline, 4-<3-[5-(N-3,4-dimethylbenzyl-N-isobutylamino)pentoxy]propylamino>-10-hydroxy-1,7-phenanthroline.

C. *4<3-[2-(N-benzyl - N - methylamino)ethoxy]propyl-amino>-10-hydroxy-1,7-phenanthroline dimethiodide*

This quaternary ammonium salt was prepared following the procedure described for Example 7B. It melted at 192.8–202.1° C. (cor.) when recrystallized from methanol.

*Anal.*—Calcd. for $C_{27}H_{34}I_2N_4O_2$: I, 36.04; N, 7.95. Found: H₂O, 0.35; I (dry basis), 35.20; N (dry basis), 7.86.

When the above procedure is followed using n-propyl iodide, isobutyl bromide, benzyl chloride or ethyl para-toluenesulfonate in place of methyl iodide, there is obtained 4-<3-[2-(N-benzyl-N-methylamino)ethoxy]propylamino> - 10 - hydroxy - 1,7-phenanthroline di-n-propiodide, 4-<3-[2-(N-benzyl-N-methylamino)ethoxy]propylamino>-10-hydroxy-1,7-phenanthroline di-n-isobutobromide, 4 - <3 - [2-(N-benzyl-N-methylamino)ethoxy]propylamino> - 10 - hydroxy-1,7-phenanthroline dibenzochloride or 4-<3-[2-(N-benzyl-N-methylamino)ethoxy]propylamino> - 10 - hydroxy-1,7-phenanthroline diethro-para-toluenesulfonate, respectively.

Additional 4 - <3 - [(N - benzyl - N - alkylamino)-alkoxy]propylamino> - 10 - hydroxy - 1,7 - phenanthroline dimethiodides that can be prepared according to the foregoing procedure using the appropriate basic phenanthroline are: 4 - <3 - [3 - (N - benzyl - N - methylamino)propoxy]propylamino> - 10 - hydroxy - 1,7 - phenanthroline dimethiodide, 4 - <3 - [4 - (N - ethylbenzyl - N - ethylamino)butoxy]propylamino> - 10 - hydroxy - 1,7 - phenanthroline dimethiodide, 4 - <3 - [5 - (N - 3,4 - dimethylbenzyl - N - isobutylamino)pentoxy]propylamino> - 10 - hydroxy - 1,7 - phenanthroline dimethiodide.

EXAMPLE 18

A. *4 - <3 - [2 - (N - benzyl - N - ethylamino)ethoxy]propylamino> - 10 - hydroxy - 1,7 - phenanthroline*

Following the procedure described for Example 1C using 8.25 g. of 3 - [2 - (N - benzyl - N - ethylamino)-ethoxy]propylamine and 4.0 g. of 4 - chloro - 10 - hydroxy - 1,7 - phenanthroline, the product obtained was 4 - <3 - [2 - (N - benzyl - N - ethylamino)ethoxy]propylamino> - 10 - hydroxy - 1,7 - phenanthroline, M. P. 104.1–105.4° C. (cor.) when recrystallized from acetonitrile.

*Anal.*—Calcd. for $C_{26}H_{30}N_4O_2$: C, 72.36; H, 7.01; N, 12.98. Found: C, 72.20; H, 6.85; N, 12.88.

Additional compounds that can be prepared according to the foregoing procedure using the appropriate intermediate sidechain are: 4 - <3 - [2 - (N - benzyl - N - n - propylamino)ethoxy]propylamino> - 10 - hydroxy - 1,7 - phenanthroline, 4 - <3 - [2 - (N - benzyl - N - isobutylamino)ethoxy]propylamino> - 10 - hydroxy - 1,7 - phenanthroline and 4 - <3 - [2 - (N - benzyl - N - n - hexylamino)ethoxy]propylamino> - 10 - hydroxy - 1,7 - phenanthroline.

B. *4 - <3 - [2 - (N - benzyl - N - ethylamino)ethoxy]propylamino> - 10 - hydroxy - 1,7 - phenanthroline dimethiodide*

This dimethiodide was prepared following the procedure described for Example 7B using the basic phenanthroline of Example 18A. It melted at 218.3–223.5° C. (cor.).

*Anal.*—Calcd. for $C_{28}H_{36}I_2N_4O_2$: I, 35.54; N, 7.84. Found: H₂O, 0.56; I (dry basis), 34.58; N, (dry basis), 7.95.

Additional dimethiodides that can be prepared using the appropriate basic phenanthroline derivative are: 4 - <3 - [2 - (N - benzyl - N - n - propylamino)ethoxy]propylamino> - 10 - hydroxy - 1,7 - phenanthroline dimethiodide, 4 - <3 - [2 - (N - benzyl - N - isobutylamino)-ethoxy]propylamino> - 10 - hydroxy - 1,7 - phenanthroline dimethiodide and 4 - <3 - [2 - (N - benzyl - N - n - hexylamino)ethoxy]propylamino> - 10 - hydroxy - 1,7 - phenanthroline dimethiodide.

EXAMPLE 19

A. *4 - <3 - [2 - (N - 2 - methoxybenzyl - N - methylamino)ethoxy]propylamino> - 10 - hydroxy - 1,7 - phenanthroline*

This compound was prepared following the procedure described for Example 1C using 8.8 g. of 3 - [2 - (N - 2 - methoxybenzyl - N - methylamino)ethoxy]propylamine and 4.0 g. of 4 - chloro - 10 - hydroxy - 1,7 - phenanthroline. It melted at 99.4–104.6° C. (cor.) when recrystallized from ethyl acetate.

*Anal.*—Calcd. for $C_{26}H_{30}N_4O_3$: C, 69.93; H, 6.77; N, 12.55. Found: C, 70.17; H, 6.99; N, 12.37.

Additional compounds prepared according to the foregoing procedure using the appropriate sidechain diamines are: 4 - <3 - [3 - (N - 3 - ethoxybenzyl - N - 3 - ethylamino)propoxy]propylamino> - 10 - hydroxy - 1,7 - phenanthroline, 4 - <3 - [4 - (N - 4 - methoxybenzyl - N - ethylamino)butoxy]propylamino> - 10 - hydroxy - 1,7 - phenanthroline, 4 - <3 - [4 - (N - 3,4 - dimethoxybenzyl - N - n - propylamino)butoxy]propylamino> - 10 - hydroxy - 1,7 - phenanthroline and 4 - <3 - [5 - (N - 3,4,5 - trimethoxybenzyl - N - ethylamino)pentoxy]propylamino> - 10 - hydroxy - 1,7 - phenanthroline.

B. *4 - <3 - [2 - (N - 2 - methoxybenzyl - N - methylamino)ethoxy]propylamino> - 10 - hydroxy - 1,7 - phenanthroline dimethiodide*

This quaternary ammonium salt was prepared following the procedure used in Example 1C. It melted at 150–153° C. when recrystallized from ethanol.

*Anal.*—Calcd. for $C_{28}H_{36}I_2N_4O_3$: I, 34.76; N, 7.67. Found: H₂O, 1.82; I (dry basis), 34.20; N (dry basis), 7.49.

Additional compounds prepared as in the preceding paragraph are: 4 - <3 - [3 - (N - 3 - ethoxybenzyl - N - ethylamino)propoxy]propylamino> - 10 - hydroxy - 1,7 - phenanthroline dimethiodide, 4 - <3 - [4 - (N - 4 - methoxybenzyl - N - ethylamino)butoxy]propylamino> - 10 - hydroxy - 1,7 - phenanthroline dimethiodide, 4 - <3 - [4 - (N - 3,4 - dimethoxybenzyl - N - n - propylamino)butoxy]propylamino> - 10 - hydroxy - 1,7 - phenanthroline dimethiodide and 4 - <3 - [5 - (N - 3,4,5 - trimethoxybenzyl - N - ethylamino)pentoxy]propylamino> - 10 - hydroxy - 1,7 - phenanthroline dimethiodide.

EXAMPLE 20

A. *4 - <3 - [2 - (N - 2,3 - dimethoxybenzyl - N - methylamino)ethoxy]propylamino> - 10 - hydroxy - 1,7 - phenanthroline*

This compound which was prepared according to the procedure described in Example 1C using 9.85 g. of 3 - [2 - (N - 2,3 - dimethoxybenzyl - N - methylamino)ethoxy]propylamine and 4.0 g. of 4 - chloro - 10 - hydroxy - 1,7 - phenanthroline, melted at 108–110° C. when recrystallized from acetonitrile.

*Anal.*—Calcd. for $C_{27}H_{32}N_4O_4$: N, 11.76. Found: N, 11.57.

Additional phenanthroline derivatives prepared as in the preceding paragraph are: 4 - <3 - [2 - (N - 4 - ethoxybenzyl - N - ethylamino)ethoxy]propylamino> - 10 - hydroxy - 1,7 - phenanthroline, 4 - <3 - [2 - (N - 3,4 - dimethoxybenzyl - N - n - butylamino)ethoxy]propylamino> - 10 - hydroxy - 1,7 - phenanthroline and 4 - <3 - [2 - (N - 3,4,5 - trimethoxybenzyl - N - n - hexylamino)ethoxy]propylamino> - 10 - hydroxy - 1,7 - phenanthroline.

B. *4 - <3 - [2 - (N - 2,3 - dimethoxybenzyl - N - methylamino)ethoxy]propylamino> - 10 - hydroxy - 1,7 - phenanthroline dimethiodide*

This compound, prepared as in Example 7B, melted at 161.9–171.3° C. (cor.).

*Anal.*—Calcd. for $C_{29}H_{38}I_2N_4O_4$: I, 33.37; N, 7.37. Found: H₂O, 2.45; I (dry basis), 33.23; N (dry basis), 7.47.

Additional compounds prepared as in the preceding paragraph are: 4 - <3 - [2 - (N - 4 - ethoxybenzyl - N - ethylamino)ethoxy]propylamino> - 10 - hydroxy - 1,7 - phenanthroline dimethiodide, 4 - <3 - [2 - (N - 3,4 - dimethoxybenzyl - N - n - butylamino)ethoxy]propylamino> - 10 - hydroxy - 1,7 - phenanthroline dimethiodide, and 4 - <3 - [2 - (N - 3,4,5 - trimethoxybenzyl - N - n - hexylamino)ethoxy]propylamino> - 10 - hydroxy - 1,7 - phenanthroline dimethiodide.

EXAMPLE 21

A. *4 - <3 - [2 - (N - 2,3 - dimethoxybenzyl - N - ethylamino)ethoxy]propylamino> - 10 - hydroxy - 1,7 - phenanthroline*

This compound, prepared according to the procedure described for Example 1C using 10.3 g. of 3 - [2 - (N - 2,3 - dimethoxybenzyl - N - ethylamino)ethoxy]propylamine and 4.0 g. of 4 - chloro - 10 - hydroxy - 1,7 - phenanthroline, melted at 86–89° C. when recrystallized from ethyl acetate.

*Anal.*—Calcd. for $C_{28}H_{34}N_4O_4$: N, 11.42. Found: N, 10.92.

B. *4 - <3-[2-(N-2,3-dimethoxybenzyl-N-ethylamino)ethoxy]propylamino> - 10 - hydroxy - 1,7 - phenanthroline dimethiodide*

This compound can be prepared following the procedure described for Example 7B using 10.3 g. of 3-[2-(N - 2,3 - dimethoxybenzyl - N - ethylamino)ethoxy] propylamine and 4 g. of 4-chloro-10-hydroxy-1,7-phenanthroline.

EXAMPLE 22

A. *4-<3-[2-(N-2-chlorobenzyl-N-methylamino)ethoxy] propylamino>-10-hydroxy-1,7-phenanthroline*

Following the procedure described for Example 1C using 7.7 g. of 3-[2-(N-2-chlorobenzyl-N-methylamino) ethoxy]propylamine and 3.5 g. of 4-chloro-10-hydroxy-1,7-phenanthroline, there was obtained 4-<3-[2-(N-2-chlorobenzyl - N - methylamino)ethoxy]propylamino>-10-hydroxy-1,7-phenanthroline, M. P. 89–90° C. when recrystallized from acetonitrile.

*Anal.*—Calcd. for $C_{25}H_{27}ClN_4O_2$: C, 66.57; H, 6.04; N, 12.42. Found: C, 66.40; H, 5.23; N, 12.25.

Additional compounds prepared as in the preceding paragraph are: 4 - <3 - [2 - (N - 4 - chlorobenzyl - N - ethylamino))ethoxy]propylamino> - 10 - hydroxy - 1,7-phenanthroline, 4 - <3 - [2 - (N - 3,4 - dibromobenzyl-N - ethylamino)ethoxy]propylamino> - 10 - hydroxy-1,7-phenanthroline and 4-<3-[5-(N-3,4-dichlorobenzyl-N - ethylamino)pentoxy] - propylamino> - 10 - hydroxy-1.7-phenanthroline.

B. *4 - <3 - [2 - (N - 2 - chlorobenzyl - N - methylamino) ethoxy]propylamino> - 10 - hydroxy - 1,7 - phenanthroline dimethiodide*

This compound can be prepared according to the procedure described for Example 7B. Additional compounds prepared as in the preceding paragraph are: 4-<3-[2-(N-4 - chlorobenzyl - N - ethylamino)ethoxy]propylamino>-10 - hydroxy - 1,7 - phenanthroline dimethiodide, 4 - <3-[2 - (N - 3,4 - dibromobenzyl - N -ethylamino)ethoxy]propylamino> - 10 - hydroxy - 1,7 - phenanthroline dimethiodide and 4 - <3 - [5 - (N - 3,4 - dichlorobenzyl - N-ethylamino)pentoxy]propylamino> - 10 - hydroxy - 1,7-phenanthroline dimethiodide.

The diquaternary ammonium salts of the 4-(tertiary-aminoalkylamino- and tertiary-aminoalkoxyalkylamino)-10-hydroxy-1,7-phenanthrolines of the foregoing examples (4–22) were found to have curarimimetic activity when tested in mice by the inclined screen test. Several of the compounds had curarimimetic activity in the same range as curare.

EXAMPLE 23

*4 - (5 - diethylaminopentylamino) - 10 - hydroxy - 1,7-phenanthroline 2-chlorobenzochloride*

A mixture of 3 g. of 4-(5-diethylaminopentylamino)-10-hydroxy-1,7-phenanthroline, 1.37 g. of 2-chlorobenzyl chloride and 50 ml. of acetonitrile was refluxed with stirring for fourteen hours. The solvent was removed by distillation in vacuo and the resulting water-soluble viscous residue was stirred with dry ethyl acetate until solidification resulted. The solid material was collected and dried first in vacuo for twenty-four hours at 80–90° C. and then for an additional seventy-two hours at 100° C., yielding 3 g. of yellow hydroscopic powder. This product, 4 - (5 - diethylaminopentylamino) - 10 - hydroxy-1,7-phenanthroline 2-chlorobenzochloride, softens slightly at about 70° C. and melts over a wide range.

*Anal.*—Calcd. for C₂₈H₃₄Cl₂N₄O: Cl⁻, 6.91; N, 10.91. Found: Cl⁻, 7.21; N, 10.63.

The following compounds can be prepared according to the procedure of the preceding example using the indicated esters: 4 - (3 - diethylamino - 2 - hydroxypropylamino) - 10 - hydroxy - 1,7 - phenanthroline benzobromide, 10 - hydroxy - 4 - [2 - (4 - morpholinyl) - ethylamino] - 1,7 - phenanthroline 4 - ethylbenzochloride, 4- [2 - (1 - piperidyl)ethylamino] - 10 - hydroxy - 1,7-phenanthroline 3,4 - dimethoxybenzochloride, 4 - [3 - (2-diethylaminoethoxy)propylamino] - 10 - hydroxy - 1,7-phenanthroline 3 - nitrobenzochloride, 4 - <3 - [2 - (N-2-methoxybenzyl - N - methylamino)ethoxy]propylamino>- 10 - hydroxy - 1,7 - phenanthroline 2 - chlorobenzochloride, 4 - <3 - [2 - (N - 2 - chlorobenzyl - N - methylamino)ethoxy]propylamino> - 10 - hydroxy - 1,7 - phenanthroline 2 - methoxybenzochloride, 4 - (5 - diethylaminopentylamino) - 10 - hydroxy - 1,7 - phenanthroline monomethiodide, 4 - (5 - diethylaminopentylamino) - 10 - hydroxy-1,7 - phenanthroline mono-n-butobromide, and the like.

EXAMPLE 24

*4-(6-diethylaminohexylamino)-10-hydroxy-1,7-phenanthroline 2-chlorobenzochloride*

A mixture of 3 g. of 4-(6-diethylaminohexylamino)-10-hydroxy-1,7-phenanthroline and 1.32 g. of 2-chlorobenzyl chloride in 50 ml. of acetonitrile was refluxed for twenty hours, and the solvent removed by distillation in vacuo. The residue was dissolved in water, and a small amount of insoluble material was removed by extraction of ether. The aqueous solution was treated with decolorizing charcoal, filtered and the filtrate distilled under reduced pressure to remove the water. The residue was dried in a vacuum oven at 65° C. over anhydrous calcium chloride for about twenty-four hours and then at 100° C. for three days. The product, 4-(6-diethylaminohexylamino)-10-hydroxy-1,7-phenanthroline 2-chlorobenzochloride, was obtained as a glassy solid which was powdered to give an amber-colored hydroscopic solid which melted at 70.9° C.

*Anal.*—Calcd. for C₂₉H₃₆Cl₂N₄O: Cl, 13.44; N, 10.62. Found: Cl, 13.41; N, 10.30.

Treatment of the above product with an equivalent of hydrogen chloride yields the monohydrochloride of 4-(6-diethylaminohexylamino) - 10 - hydroxy - 1,7 - phenanthroline 2-chlorobenzochloride.

The following 2-chlorobenzochlorides can be prepared according to the procedure described in Example 24 using the indicated basic phenanthroline: 4-(2-diethylaminoethylamino) - 10 - hydroxy - 1,7 - phenanthroline 2 - chlorobenzochloride, 4 - (3 - diethylaminopropylamino) - 10-hydroxy - 1,7 - phenanthroline 2 - chlorobenzochloride and 4 - (3 - dimethylaminopropylamino) - 10 - hydroxy-1,7-phenanthroline 2-chlorobenzochloride.

The 4 - substituted - amino - 10 - hydroxy - 1,7 - phenanthrolines and their acid-addition and quaternary ammonium salts of the present invention were found to have anticholinesterase activity as determined by the electrometric titration procedure of H. O. Michael [J. Lab. Clin. Med. 34, 1564–8 (1949)].

This application is a continuation-in-part of my copending application, Serial No. 391,765, filed November 12, 1953, now abandoned.

I claim:

1. A compound selected from the group consisting of a 4-substituted-amino-10-hydroxy-1,7-phenanthroline, its acid addition salts and quaternary ammonium salts, said phenanthroline having the formula

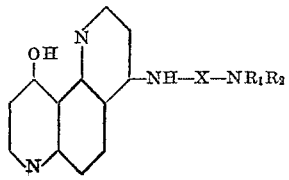

where X is a member of the group consisting of an alkylene radical having two to eight carbon atoms and having its two free valence bonds on different carbon atoms, a 2-hydroxy-1,3-propylene radical, and an oxa-alkylene radical having four to eight carbon atoms and having its oxygen atom at least one carbon atom removed from each terminal carbon atom bearing a free valence bond and NR₁R₂ is a member of the group consisting of di-(lower alkyl)amino, N-(lower alkyl)-N-(lower beta-hydroxyalkyl)amino, N-(lower alkyl)-N-benzylamino, N-(lower alkyl)-N-(lower alkylated-benzyl)amino, N-(lower alkyl)-N-(lower alkoxylated-benzyl)amino, N-(lower alkyl)-N-(halogenated-benzyl)amino, 1-piperidyl, (lower alkylated)-1-piperidyl, 1-pyrrolidyl, (lower alkylated)-1-pyrrolidyl and 4-morpholinyl.

2. A quaternary ammonium salt having the formula

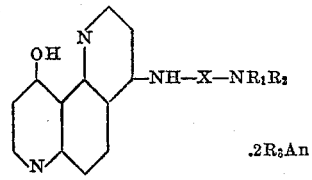

where X is an alkylene radical having two to eight carbon atoms and having its two free valence bonds on different carbon atoms, R₁, R₂ and R₃ are each lower alkyl radicals and An is a non-toxic anion.

3. A quaternary ammonium salt having the formula

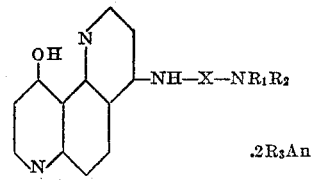

where X is an oxa-alkylene radical having from four to eight carbon atoms and having its oxygen atom at least one carbon atom removed from each terminal carbon atom bearing a free valence bond, R₁, R₂ and R₃ are each lower alkyl radicals and An is a non-toxic anion.

4. A quaternary ammonium salt having the formula

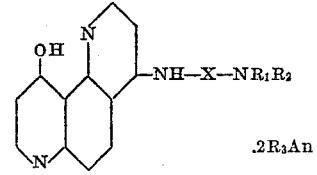

where X is an oxa-alkylene radical having from four to eight carbon atoms and having its oxygen atom at least one carbon atom removed from each terminal carbon atom bearing a free valence bond, NR₁R₂ is a 1-piperidyl radical, R₃ is a lower alkyl radical and An is a non-toxic anion.

5. A quaternary ammonium salt having the formula

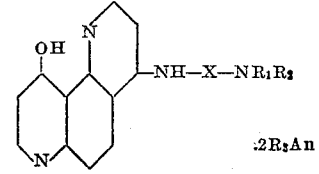

where X is an oxa-alkylene radical having from four to eight carbon atoms and having its oxygen atom at least one carbon atom removed from each terminal carbon atom bearing a free valence bond, NR₁R₂ is an N-(lower alkyl)-N-(lower alkoxylated-benzyl)amino radical, R₃ is a lower alkyl radical and An is a non-toxic anion.

6. A quaternary ammonium salt having the formula

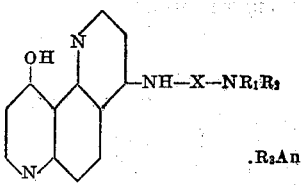

where X is an alkylene radical having two to eight carbon atoms and having its two free valence bonds on different carbon atoms, $R_1$ and $R_2$ are each lower alkyl radicals, $R_3$ is a halogenated-benzyl radical and An is a non-toxic anion.

7. A quaternary ammonium salt having the formula

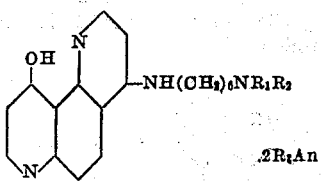

where $R_1$, $R_2$ and $R_3$ are each lower alkyl radicals and An is a halide anion.

8. A quaternary ammonium salt having the formula

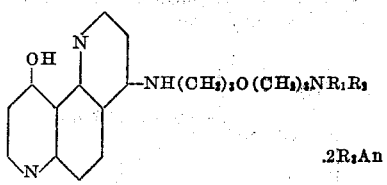

where $R_1$, $R_2$ and $R_3$ are each lower alkyl radicals and An is a halide anion.

9. A quaternary ammonium salt having the formula

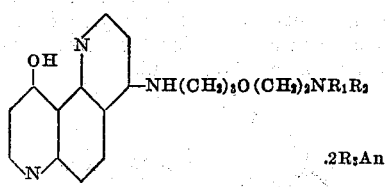

where $R_1$, $R_2$ and $R_3$ are each lower alkyl radicals and An is a halide anion.

10. A quaternary ammonium salt having the formula

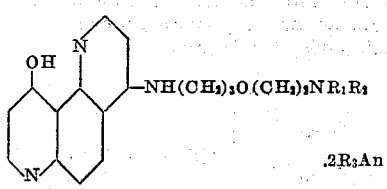

where $NR_1R_2$ is a 1-piperidyl radical, $R_3$ is a lower alkyl radical and An is a halide anion.

11. A quaternary ammonium salt having the formula

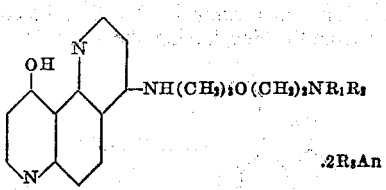

where $NR_1R_2$ is an N-(lower alkyl)-N-(lower alkoxylated-benzyl)amino radical, $R_3$ is a lower alkyl radical and An is a halide anion.

12. A quaternary ammonium salt having the formula

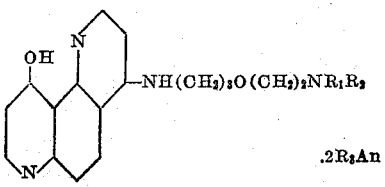

where $NR_1R_2$ is an N-(lower alkyl)-N-(monoalkoxybenzyl)amino radical, $R_3$ is a lower alkyl radical and An is a halide anion.

13. A quaternary ammonium salt having the formula

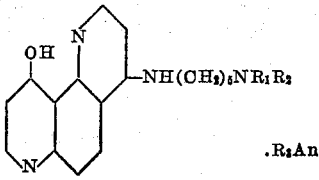

where $R_1$ and $R_2$ are each lower alkyl radicals, $R_3$ is a halobenzyl radical and An is a halide anion.

14. 4-(6-diethylaminohexylamino)-10-hydroxy-1,7-phenanthroline dimethohalide.

15. 4-[3-(3-diethylaminopropoxy)propylamino]-10-hydroxy-1,7-phenanthroline dimethohalide.

16. 4-[3-(2-diethylaminoethoxy)propylamino]-10-hydroxy-1,7-phenanthroline dimethohalide.

17. 4-<3-[2-(1-piperidyl)ethoxy]propylamino>-10-hydroxy-1,7-phenanthroline dimethohalide.

18. 4-<3-[2-(N-2-methoxybenzyl-N-methylamino)ethoxy]propylamino>-10-hydroxy-1,7-phenanthroline dimethohalide.

19. 4-(5-diethylaminopentylamino)-10-hydroxy-1,7-phenanthroline 2-chlorobenzohalide.

20. 4-chloro-10-hydroxy-1,7-phenanthroline.

21. A process for the preparation of a quaternary ammonium salt having the formula

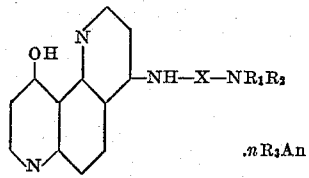

where X is a member of the group consisting of an alkylene radical having two to eight carbon atoms and having its two free valence bonds on different carbon atoms, a 2-hydroxy-1,3-propylene radical, and an oxa-alkylene radical having four to eight carbon atoms and having its oxygen atom at least one carbon atom removed from each terminal carbon atom bearing a free valence bond, $NR_1R_2$ is a member of the group consisting of di-(lower alkyl) amino, N-(lower alkyl)-N-(lower beta-hydroxyalkyl)-amino, N-(lower alkyl)-N-benzylamino, N-(lower alkyl)-N-(lower alkylated-benzyl)amino, N-(lower alkyl)-N-(lower alkoxylated-benzyl)amino, N-(lower alkyl)-N-(halogenated-benzyl)amino, 1-piperidyl, (lower alkylated)-1-piperidyl, 1-pyrrolidyl, (lower alkylated)-1-pyrrolidyl and 4-morpholinyl, n is an integer from 1 to 4, $R_3$ is a member of the group consisting of lower alkyl, benzyl, (lower alkylated)-benzyl, (lower alkoxylated)-benzyl, halogenated-benzyl and nitrobenzyl, and An is a non-toxic anion, which comprises treating the corresponding basic phenanthroline having the formula

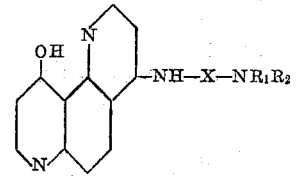

with at least n molar equivalents of the ester, $R_3An$.

22. A process for the preparation of a quaternary ammonium salt having the formula

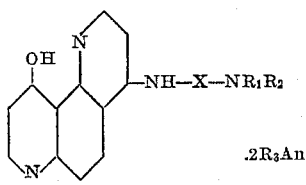

where X is an alkylene radical having two to eight carbon atoms and having its two free valence bonds on different carbon atoms, $R_1$, $R_2$ and $R_3$ are each lower alkyl radicals and An is a non-toxic anion, which comprises treating the corresponding basic phenanthroline having the formula

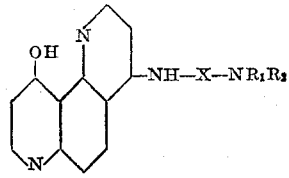

with at least two molar equivalents of the ester, $R_3An$.

23. A process for the preparation of a quaternary ammonium salt having the formula

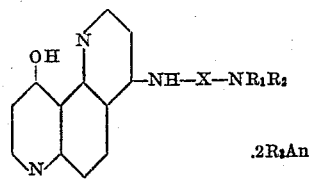

where X is an oxa-alkylene radical having from four to eight carbon atoms and having its oxygen atom at least one carbon atom removed from each terminal carbon atom bearing a free valence bond, $R_1$, $R_2$ and $R_3$ are each lower alkyl radicals and An is a non-toxic anion, which comprises treating the corresponding basic phenanthroline having the formula

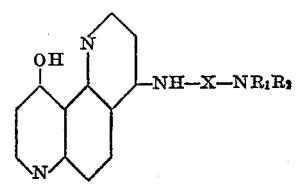

with at least two molar equivalents of the ester, $R_3An$.

24. A process for the preparation of a quaternary ammonium salt having the formula

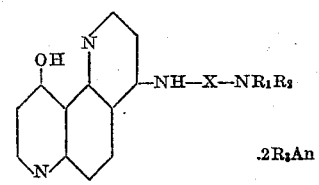

where X is an oxa-alkylene radical having from four to eight carbon atoms and having its oxygen atom at least one carbon atom removed from each terminal carbon atom bearing a free valence bond, $NR_1R_2$ is a 1-piperidyl radical, $R_3$ is a lower alkyl radical and An is a non-toxic anion, which comprises treating the corresponding basic phenanthroline having the formula

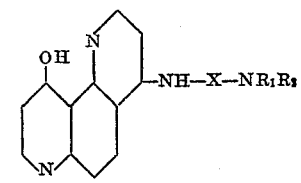

with at least two molar equivalents of the ester, $R_3An$.

25. A process for the preparation of a quaternary ammonium salt having the formula

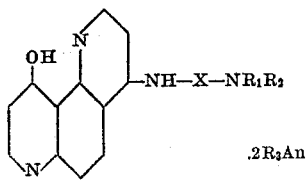

where X is an oxa-alkylene radical having from four to eight carbon atoms and having its oxygen atom at least one carbon atom removed from each terminal carbon atom bearing a free valence bond, $NR_1R_2$ is an N-(lower alkyl)-N-(lower alkoxylated-benzyl)amino radical, $R_3$ is a lower alkyl radical and An is a non-toxic anion, which comprises treating the corresponding basic phenanthroline having the formula

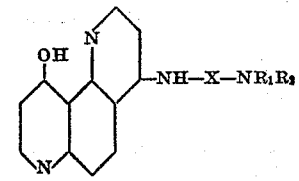

with at least two molar equivalents of the ester, $R_3An$.

26. A process for the preparation of a quaternary ammonium salt having the formula

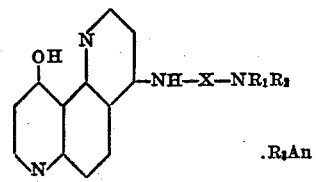

where X is an alkylene radical having two to eight carbon atoms and having its two free valence bonds on different carbon atoms, $R_1$ and $R_2$ are each lower alkyl radicals, $R_3$ is a halogenated-benzyl radical and An is a non-toxic anion, which comprises treating the corresponding basic phenanthroline having the formula

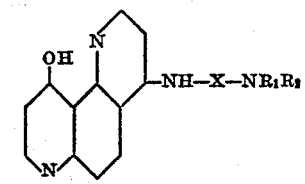

with at least one molar equivalent of the ester, $R_3An$.

27. A process for the preparation of a quaternary ammonium salt having the formula

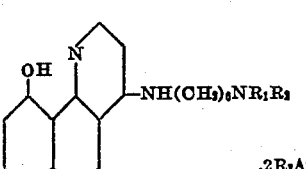

where $R_1$, $R_2$ and $R_3$ are each lower alkyl radicals and An is a halide anion, which comprises treating the corresponding basic phenanthroline having the formula

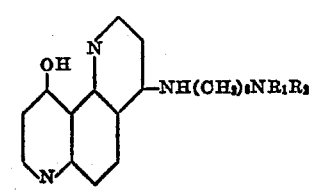

with at least two molar equivalents of the ester, $R_3An$.

28. A process for the preparation of a quaternary ammonium salt having the formula

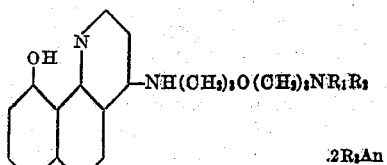

where $R_1$, $R_2$ and $R_3$ are each lower alkyl radicals and An is a halide anion, which comprises treating the corresponding basic phenanthroline having the formula

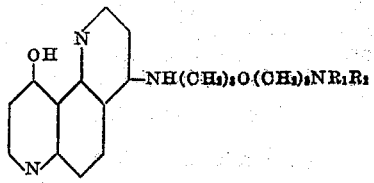

with at least two molar equivalents of the ester, $R_3An$.

29. A process for the preparation of a quaternary ammonium salt having the formula

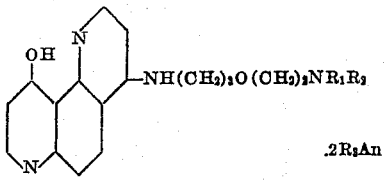

where $R_1$, $R_2$ and $R_3$ are each lower alkyl radicals and An is a halide anion, which comprises treating the corresponding basic phenanthroline having the formula

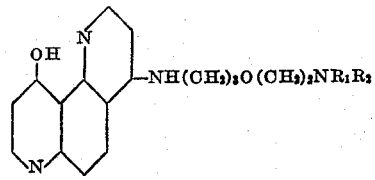

with at least two molar equivalents of the ester, $R_3An$.

30. A process for the preparation of a quaternary ammonium salt having the formula

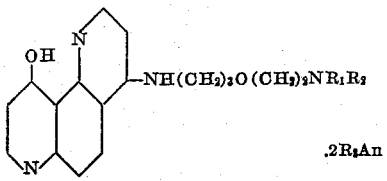

where $NR_1R_2$ is a 1-piperidyl radical, $R_3$ is a lower alkyl radical and An is a halide anion, which comprises treating the corresponding basic phenanthroline having the formula

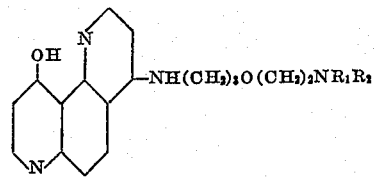

with at least two molar equivalents of the ester, $R_3An$.

31. A process for the preparation of a quaternary ammonium salt having the formula

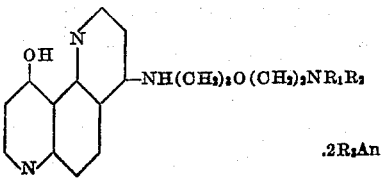

where $NR_1R_2$ is an N-(lower alkyl)-N-(lower alkoxylated-benzyl)amino radical, $R_3$ is a lower alkyl radical and An is a halide anion, which comprises treating the corresponding basic phenanthroline having the formula

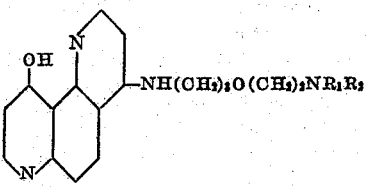

with at least two molar equivalents of the ester, $R_3An$.

32. A process for the preparation of a quaternary ammonium salt having the formula

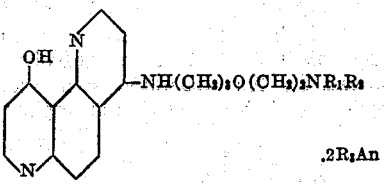

where $NR_1R_2$ is an N-(lower alkyl)-N-(monoalkoxybenzyl)amino radical, $R_3$ is a lower alkyl radical and An is a halide anion, which comprises treating the corresponding basic phenanthroline having the formula

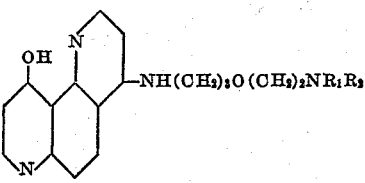

with at least two molar equivalents of the ester, $R_3An$.

33. A process for the preparation of a quaternary ammonium salt having the formula

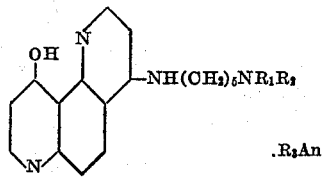

where $R_1$ and $R_2$ are each lower alkyl radicals, $R_3$ is a halobenzyl radical and An is a halide anion, which comprises treating the corresponding basic phenanthroline having the formula

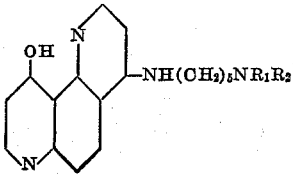

with at least one molar equivalent of the ester, $R_3An$.

34. A process for the preparation of 4-(6-diethylaminohexylamino)-10-hydroxy-1,7-phenanthroline dimethohalide which comprises treating 4-(6-diethylaminohexylamino)-10-hydroxy-1,7-phenanthroline with at least two molar equivalents of a methyl halide.

35. A process for the preparation of 4-[3-(3-diethylaminopropoxy)propylamino] - 10 - hydroxy - 1,7 - phenanthroline dimethohalide which comprises treating 4-[3 - (3 - diethylaminopropoxy)propylamino] - 10 - hydroxy-1,7-phenanthroline with at least two molar equivalents of a methyl halide.

36. A process for the preparation of 4-[3-(2- diethylaminoethoxy)propylamino] - 10 - hydroxy - 1,7 - phenanthroline dimethohalide which comprises treating 4-[3 - (2 - diethylaminoethoxy)propylamino] - 10 - hydroxy-1,7-phenanthroline with at least two molar equivalents of a methyl halide.

37. A process for the preparation of 4-<3-[2-(1-piperidyl)ethoxy]propylamino> - 10 - hydroxy - 1,7 - phenanthroline dimethohalide which comprises treating 4 - <3 - [2 - (1 - piperidyl)ethoxy]propylamino> - 10 - hydroxy-1,7-phenanthroline with at least two molar equivalents of a methyl halide.

38. A process for the preparation of 4-<3-[2-(N-2-methoxybenzyl - N - methylamino)ethoxy]propylamino>-10-hydroxy-1,7-phenanthroline dimethohalide which comprises treating 4-<3-[2-(N-2-methoxybenzyl-N-methylamino)ethoxy]propylamino> - 10 - hydroxy - 1,7 - phenanthroline with at least two molar equivalent of a methyl halide.

39. A process for the preparation of 4-(5-diethylaminopentylamino)-10-hydroxy-1,7-phenanthroline 2-chlorobenzohalide which comprises treating 4-(5-diethylaminopentylamino)-10-hydroxy-1,7-phenanthroline with at least one molar equivalent of a 2-chlorobenzyl halide.

40. A process for the preparaton of a 4-substituted-amino-10-hydroxy-1,7-phenanthroline having the formula

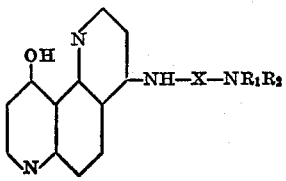

where X is a member of the group consisting of an alkylene radical having two to eight carbon atoms and having its two free valence bonds on different carbon atoms, a 2-hydroxy-1,3-propylene radical, and an oxa-alkylene radical having four to eight carbon atoms and having its oxygen atom at least one carbon atom removed from each terminal carbon atom bearing a free valence bond and $NR_1R_2$ is a member of the group consisting of di-(lower alkyl)amino, N-(lower alkyl)-N-(lower alkyl)amino, N-(lower alkyl)-N-(lower beta-hydroxyalkyl)amino, N-(lower alkyl)-N-benzylamino, N-(lower alkyl)-N-(lower alkylated-benzyl)amino, N-(lower alkyl)-N-(lower alkoxylated-benzyl)amino, N-(lower alkyl)-N-(halogenated-benzyl)amino, 1-piperidyl, (lower alkylated)-1-piperidyl, 1-pyrrolidyl, (lower alkylated)-1-pyrrolidyl and 4-morpholinyl, which comprises heating 4-chloro-10-hydroxy-1,7-phenanthroline with a diamine having the formula $$H_2N—X—NR_1R_2.$$

No references cited.